United States Patent [19]
Hager

[11] Patent Number: 4,950,694
[45] Date of Patent: Aug. 21, 1990

[54] PREPARATION OF POLYURETHANE FOAMS WITHOUT USING INERT BLOWING AGENTS

[75] Inventor: Stanley L. Hager, Crosslanes, W. Va.

[73] Assignee: Union Carbide Chemicals and Plastics Company Inc., Danbury, Conn.

[21] Appl. No.: 373,244

[22] Filed: Jun. 29, 1989

[51] Int. Cl.$^5$ .............................................. C08G 18/14
[52] U.S. Cl. .................................... 521/167; 521/137; 521/176
[58] Field of Search ......................... 521/167, 176, 137

[56] References Cited

U.S. PATENT DOCUMENTS

| | | | |
|---|---|---|---|
| 2,993,013 | 7/1961 | Wolfe Jr. | 260/2.5 |
| 3,153,002 | 10/1964 | Wismer et al. | 260/2.5 |
| 3,208,957 | 9/1965 | Powanda et al. | 260/2.5 |
| 3,210,300 | 10/1965 | Leibu et al. | 260/2.5 |
| 3,267,050 | 8/1965 | Kuryla et al. | 260/2.5 |
| 3,332,934 | 7/1967 | Booth et al. | 260/205 |
| 3,369,014 | 2/1968 | Booth | 260/209 |
| 3,377,296 | 4/1968 | Dwyer et al. | 260/2.5 |
| 3,433,751 | 3/1969 | Yotsuzuka et al. | 260/2.5 |
| 3,442,888 | 5/1969 | Degginger et al. | 260/209 |
| 3,506,600 | 11/1970 | Zocco et al. | 260/2.5 |
| 3,523,093 | 8/1970 | Stamberger | 260/2.5 |
| 3,535,307 | 10/1970 | Moss et al. | 260/209 |
| 3,558,529 | 1/1971 | Whitman et al. | 260/2.5 |
| 3,644,235 | 2/1972 | Gray | 260/2.5 |
| 3,674,721 | 7/1972 | Aufdermarsh Jr. et al. | 260/2.5 |
| 3,723,365 | 3/1973 | Speranza et al. | 260/2.5 |
| 3,755,211 | 8/1973 | Fabris et al. | 260/2.5 |
| 3,763,111 | 10/1973 | Fijal | 260/77.5 |
| 3,801,518 | 4/1972 | Irwin et al. | 260/2.5 |
| 3,801,518 | 4/1974 | Fishbein et al. | 260/2.5 |
| 3,869,413 | 3/1975 | Blankenship | 260/2.5 |
| 3,887,505 | 5/1975 | Demou et al. | 260/2.5 |
| 3,890,254 | 6/1975 | Guthrie | 260/2.5 |
| 3,890,255 | 6/1975 | Van Leuwen et al. | 260/2.5 |
| 3,892,691 | 7/1975 | White et al. | 260/2.5 |
| 3,925,266 | 12/1975 | Fabris et al. | 260/2.5 |
| 3,931,066 | 1/1976 | Puig et al. | 260/2.5 |
| 3,959,191 | 5/1976 | Kehr et al. | 260/2.5 |
| 4,032,468 | 6/1977 | Treadwell et al. | 252/182 |
| 4,043,949 | 8/1977 | Treadwell et al. | 260/2.5 |
| 4,049,590 | 9/1977 | Falkenstein et al. | 260/2.5 |
| 4,060,439 | 11/1977 | Rosemund et al. | 156/78 |
| 4,066,579 | 1/1978 | Yukuta et al. | 260/2.5 |
| 4,067,831 | 1/1978 | Wasilczyk | 260/2.5 |
| 4,089,835 | 5/1978 | Konig et al. | 260/31.6 |
| 4,102,833 | 7/1978 | Salisbury | 521/159 |
| 4,107,102 | 8/1978 | Kahm et al. | 521/163 |
| 4,111,828 | 9/1978 | Wang | 252/182 |
| 4,111,865 | 9/1978 | Seefried Jr. et al. | 521/137 |
| 4,137,200 | 1/1979 | Wood et al. | 521/159 |
| 4,190,712 | 2/1980 | Flanagan | 521/137 |
| 4,209,593 | 6/1980 | Khanna | 521/163 |
| 4,211,849 | 7/1980 | Kollmeier et al. | 521/164 |
| 4,223,098 | 9/1980 | Treadwell | 521/116 |
| 4,226,756 | 10/1980 | Critchfield et al. | 252/182 |
| 4,230,824 | 10/1980 | Nodelman | 521/167 |
| 4,239,856 | 12/1980 | Rowton | 521/118 |
| 4,243,759 | 1/1981 | Haas | 521/167 |
| 4,264,744 | 4/1981 | Milovanovic et al. | 521/110 |
| 4,266,043 | 5/1981 | Fujii et al. | 521/175 |
| 4,283,500 | 8/1981 | Armstrong et al. | 521/137 |
| 4,302,552 | 2/1981 | Hongu et al. | 521/176 |
| 4,304,875 | 12/1981 | Duvernay et al. | 521/112 |
| 4,327,194 | 4/1982 | Chandalia et al. | 521/99 |
| 4,341,875 | 7/1982 | Visger et al. | 521/175 |
| 4,374,934 | 2/1983 | Raynor | 521/112 |
| 4,376,834 | 3/1983 | Goldwasser et al. | 521/159 |
| 4,385,133 | 5/1983 | Alberino et al. | 521/159 |
| 4,452,924 | 6/1984 | Radovich | 521/174 |
| 4,477,602 | 10/1984 | Liang et al. | 521/137 |
| 4,487,854 | 12/1984 | Hartman | 521/174 |
| 4,490,490 | 12/1984 | Patton, Jr. et al. | 521/177 |
| 4,518,720 | 5/1985 | Cuscurida et al. | 521/156 |
| 4,528,112 | 7/1985 | Speranza et al. | 252/182 |
| 4,530,941 | 7/1985 | Turner et al. | 252/182 |
| 4,544,678 | 10/1985 | Fesman | 521/107 |
| 4,546,122 | 10/1985 | Radovich et al. | 521/164 |

(List continued on next page.)

FOREIGN PATENT DOCUMENTS

| | | |
|---|---|---|
| 296449 | 12/1988 | European Pat. Off. . |
| 57-133112 | 12/1988 | Japan . |
| 1339442 | 12/1973 | United Kingdom . |
| 1480972 | 4/1975 | United Kingdom . |

OTHER PUBLICATIONS

Consoli et al., Journal of Cellular Plastics, May–Jun. 1984, pp. 200–208.
Dwyer, F. J. et al., Proceedings of the SPI Cellular Plastics, 7th Annual Technical Conference.
Smiecinski et al., Proceedings of the SPI 31st Annual Technical/Marketing Conference, 1988.
Dwyer et al., Plastics, May 1964, pp. 139 et seq.
Piperno and Wojtasinski, "New Hypersoft Urethane Foams", (Produits Chimiques Ugine Kuhlmann/France).
Carey and Turner, "Low Density Urethane Foam for Automotive Seating Using Low Functionality MDI and Polyol", pp. 437–446.

Primary Examiner—Maurice J. Welsh
Attorney, Agent, or Firm—Paul W. Leuzzi

[57] ABSTRACT

A process for making low density and optionally low resilience, soft, flexible polyurethane slabstock foam having a substantially open cell structure without crushing, without requiring auxiliary inert blowing agents, by reacting under a condition which permits the foam to rise freely, a conventional hydroxyl-containing polyether polyol with a polyisocyanate at an isocyanate index of between about 60 and 95 in the presence of a foam processing aid comprising a low equivalent weight crosslinking agent and/or extending agent and, as needed, a cell opening agent.

47 Claims, No Drawings

U.S. PATENT DOCUMENTS

| | | | |
|---|---|---|---|
| 4,596,665 | 6/1986 | Gonzalez et al. | 521/167 |
| 4,642,320 | 2/1987 | Turner et al. | 521/176 |
| 4,652,495 | 3/1987 | Sato et al. | 428/425.5 |
| 4,661,529 | 4/1987 | Kuhn et al. | 521/137 |
| 4,689,353 | 8/1987 | Harris | 521/159 |
| 4,689,357 | 8/1987 | Hongu et al. | 521/176 |
| 4,701,474 | 10/1987 | Bailey, Jr. et al. | 521/137 |
| 4,722,942 | 2/1988 | Nichols et al. | 521/110 |
| 4,722,946 | 2/1988 | Hostettler | 521/158 |
| 4,738,993 | 4/1988 | Markovs | 521/163 |
| 4,742,089 | 5/1988 | Naka et al. | 521/110 |
| 4,743,628 | 5/1988 | Conkey et al. | 521/163 |
| 4,751,253 | 6/1988 | Tylenda | 521/114 |
| 4,758,601 | 7/1988 | Haas et al. | 521/108 |
| 4,782,099 | 11/1988 | Dietrich et al. | 521/175 |
| 4,785,026 | 11/1988 | Yeakey et al. | 521/137 |
| 4,786,656 | 11/1988 | Presswood et al. | 521/159 |
| 4,791,146 | 12/1988 | Tylenda | 521/114 |
| 4,798,851 | 1/1989 | Werner et al. | 521/137 |
| 4,833,176 | 5/1989 | Wolf et al. | 521/160 |

PREPARATION OF POLYURETHANE FOAMS WITHOUT USING INERT BLOWING AGENTS

BACKGROUND OF THE INVENTION

1. Field of the Invention

This invention relates to the production of flexible polyurethane foams. More particularly, this invention relates to a process for producing low density, flexible polyurethane foams at a low isocyanate index. This invention especially relates to a process for producing conventional, free-rise, low density, flexible polyurethane foams, which exhibit a substantially open cell structure without crushing and without using any inert blowing agents such as chlorofluorocarbons, methylene chloride, or other halocarbons.

2. Description of Related Art

Polyurethane foams are prepared by reacting a polyisocyanate with an active hydrogen-containing compound, as measured by the Zerewitinoff method, such as a polyol, in the presence of water and other optional ingredients. Catalysts are employed to promote two major reactions.

One reaction is primarily a chain extending isocyanate-hydroxyl reaction or gelation reaction by which a hydroxyl-containing molecule is reacted with an isocyanate-containing molecule to form a urethane linkage. The progress of this reaction increases the viscosity of the mixture, and generally contributes to crosslink formation with polyfunctional polyols (i.e. polyols having a nominal functionality above 2). The second major reaction comprises an isocyanate-water reaction wherein an isocyanate-terminated molecule is extended by urea formation and by which carbon dioxide is generated to "blow" or assist in the "blowing" of the foam. The in-situ generation of carbon dioxide by this reaction plays an essential part in the preparation of "one-shot" flexible polyurethane foam. Such foams are often referred to as "water-blown" flexible polyurethane foams.

In order to obtain a good urethane foam structure and desired physical properties, these reactions must proceed simultaneously at competitively balanced rates and in properly balanced degrees relative to each other. For example, if the carbon dioxide evolution (i.e. the water reaction) is too rapid in comparison with the chain extension reaction, the foam tends to split or collapse. Alternatively, if the chain extension reaction is too rapid in comparison with the reaction that generates carbon dioxide, foam rise will be restricted, thus resulting in a higher-density foam with a high closed cell content, i.e. a tight foam.

It has long been known that tertiary amines, such as trimethylamine, triethylamine, dimethylaminoethanol, tetramethyl propanediamine, triethylenediamine, dimethylethanolamine, methyl triethylenediamine, N-methylmorpholine, N-ethylmorpholine and especially bis-(2-dimethylaminoethyl) ether are effective for catalyzing the water-isocyanate reaction that causes carbon dioxide evolution.

However, tertiary amines are only partially effective as catalysts for the chain extension reaction and thus normally are used in combination with other catalysts, typically an organic tin catalyst. For example, in the preparation of flexible foams, a one-step or "one-shot" free rise process has long been used wherein a tertiary amine is employed for promoting the water-isocyanate reaction; while an organic tin compound is used in synergistic combination with the amine to promote the chain extension reaction.

Organic tin compounds particularly useful in making flexible foams from polyether feedstocks include stannous or stannic compounds, such as a stannous salt of a carboxylic acid, i.e., a stannous acylate; a trialkyltin oxide; a dialklyltin dihalide; a dialkyltin oxide, and the like, wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, have been used.

Polyurethane foams are widely employed in the manufacture of a variety of products and, depending on the end use, can be tailor made to fit the particular application and desired physical properties. The polyurethane industry has come to recognize two, generally distinct, categories of flexible foam products: high resilience foams and conventional, lower resilience foams. High resilience (HR) foam is widely used for furniture cushions, mattresses, automotive cushions and padding, and numerous other applications requiring better support and comfort. Conventional foam also is used in these applications and finds additional applications in the areas of carpet underlays and packaging materials.

HR foam is differentiated from conventional foam by its higher comfort or support factor and higher resilience. In its strictest definition, as set forth in ASTM Method D-3770-79, an HR foam is one having a ball rebound value (ASTM D-3574) of greater than 60%, though, in practice, foams with a ball rebound value as low as about 55% are often included in the class of HR foams. The lower resilience, conventional foam typically has a ball rebound value of less than about 55% and often below 50%. HR foam also is usually produced using low water levels to provide higher foam densities, typically above 1.5 pounds per cubic foot (pcf) and often above 2.5 pcf, while conventional foam generally has a density below about 1.8 pounds per cubic foot (pcf), and for the most part below about 1.5 pcf.

HR foam generally is produced using high ethylene oxide content polyols having equivalent weights above about 1600 and primary hydroxyl contents of above 50%; while conventional foams are made using lower ethylene oxide content polyols of equivalent weights below 1300 and often containing only secondary hydroxyls. These foam types also differ on the surface active agents used in their preparation. Conventional foams normally are made with the highly stabilizing polysiloxane-polyoxyalkylene copolymers while HR foams use less stabilizing surfactants, such as dimethylsiloxane oils. Tight, shrinking foams are produced if the highly stabilizing conventional surfactants are used in HR foam formulations.

HR foams also can be distinguished from conventional foams on the basis of their cell structure or porosity. When initially produced, HR foams have an essentially closed cell structure with very low porosity. It is thought that this structure is, in part, a consequence of the use of more reactive polyols and the higher level of crosslinking in HR foam formulations. Because this cell structure impairs the physical properties of the foam, HR foam generally is processed further in a separate crushing or mechanical deformation operation to open the cells. This adds additional cost to the ultimate foam product. Conventional foams, in contrast, typically exhibit an open cell structure and relatively high porosity as they are produced. Thus, there is no need to process the foam to alter cell structure.

Commercially, water-blown flexible polyurethane foams are produced by both molded and free-rise (slab foam) processes. Conventional foam is almost always made using the free-rise process; where as HR foam often is made using closed molds. Slab foams are generally produced more or less continuously by the free-rise process in large buns which, after curing, are sliced or otherwise formed into useful shapes. For example, carpet underlayment is sliced from large buns of polyurethane foam. Molding is utilized to produce, in what is a batchwise process, an article in essentially its final dimensions. Automotive seating and some furniture cushions are examples of employment of the molding process. Slab foam buns produced using the free-rise process tend to be much larger than molded foams. While molded foam objects are normally less than about ten cubic feet in volume, slab foam buns are rarely less than 50 cubic feet in volume. As a result, the preparation of free-rise foams present some unique problems to those in the polyurethane industry.

Commercial, low density and low resilience, free-rise (slabstock) conventional polyurethane foam formulations typically contain (1) a polyether polyol having an equivalent weight below about 1500 and having more than about 50% secondary hydroxyl groups; (2) toluene diisocyanate at an isocyanate index of between about 105 and 120; (3) a highly efficient polyether-silicone copolymer stabilizer; (4) amine and tin catalysts; (5) water between about 2 to about 6 parts per hundred parts polyol (php); (6) an inert blowing agent such as a chlorofluorocarbon, methylene chloride, or other halocarbons to assist foam blowing and/or to cool the foam and miscellaneous other additives such as fillers, flame retardants, and the like. The inert blowing agents also are utilized to soften foams made at densities below about 2.0 pcf. Isocyanate index is the percentage of the calculated stoichiometric amount of isocyanate needed to react with all active hydrogen components in the formulation. Thus, an isocyanate index of 110 means that 110% of the amount of isocyanate stoichiometrically required to react with all active hydrogen compounds is used.

In recent years, processes have been sought by the polyurethane industry for making polyurethane foam products while eliminating, or at least substantially reducing, the amount of inert blowing agents, particularly chlorofluorocarbons (CFCs). CFCs are known to damage the Earth's protective ozone layer, an effect which is expected to lead to a greater incidence of skin cancer and related maladies caused by solar exposure, as well as possible catastrophic climate changes. The U.S. Environmental Protection Agency recently has pushed for a complete phaseout of the use of such ozone-depleting chemicals. Another blowing agent, methylene chloride, also has fallen into disfavor due to concerns about short and possibly longer term health effects. Thus, the current trend is to avoid or minimize the use of such inert blowing agents, if possible, in the preparation of polyurethane foams.

Unfortunately, for the most part, commercial production of low density and low resilience, conventional flexible foam, e.g. at densities below about 1.5 pound per cubic foot (pcf), using the free-rise process requires using such inert blowing agents to lower foam densities and, in part of provide cooling. Attempts at preparing such low density foams at normal isocyanate indexes, e.g., at indexes of about 100 to 120, by using additional water to "blow" the foam via the isocyanate-water reaction, causes foam over-heating and significantly increases the hazard of fire. The hazard of fire is greatly diminished when producing molded foam due to the small volume of the articles produced which facilitates their rapid cooling.

Overheating and load (firmness) in free rise foam might be controlled to some extent by lowering the isocyanate index, and carefully controlling other process parameters such as the catalyst system. However, water-only "blown," conventional, flexible polyurethane foams formulated with "conventional polyols" at isocyanate indexes blow about 100, and particularly below about 90 to 95, often experience foam splitting, i.e. sizeable openings or voids in either or both the surface and interior of the foam. The problem with splitting becomes more severe as the isocyanate index is lowered further to control more carefully the potential for foam overheating and/or to produce very soft foams. Thus, increasing the amount of water used to "blow" the foam, while at the same time lowering the isocyanate index, generally does not represent a practical solution to the CFC problem in free-rise foams.

A soft flexible foam, apparently produced via a free-rise, one-shot process at isocyanate indexes between about 70 and 100 by using polyols (triols) of lower molecular weight (1000) and lower equivalent weight (350), either alone or in conjunction with some standard, i.e. conventional, 3000 molecular weight polyol (triol), up to 4 php water and slightly lower catalyst levels is described by F. J. Dwyer et al. in the Proceedings of the SPI Cellular Plastics 7th Annual Technical Conference. Densities down to about 1.5–1.6 pcf purportedly were produced without auxiliary (inert) blowing agents. However, still lower foam densities required the use of inert blowing agents. T. M. Smiecinski, S. E. Wujcik and O. M. Grace (Polyurethanes 88: Proceedings of the SPI-31st Annual Technical/Marketing Conference, Oct., 1988) also describe the lab scale production of soft foam using a lower molecular weight triol and up to 5 php water, at an 85 isocyanate index. Foam with a density as low as 1.38 pcf purportedly was produced without axiliary (inert) blowing agent.

U.S. Pat. No. 4,833,176 describes a procedure for making a cold cure, soft molded polyurethane foam using an isocyanate index of less than 70, and preferably 40 to 60, water in an amount of up to 15 php as a blowing agent, and optionally a chain extender or crosslinking agent.

Although a variety of methods and polyurethane formulations have been reported in the literature, to date none has disclosed a process of safely making a conventional, free-rise, flexible polyurethane foam at a low density and over a wide range of low isocyanate indexes, i.e. from as low as 60 up to about 95, using conventional polyols while employing little or no inert blowing agent and avoiding problems with foam splitting or foam tightness.

DESCRIPTION OF THE INVENTION

This invention broadly relates to a process for producing a low density, and generally low resilience and soft, flexible polyurethane foam which exhibits a substantially open cell structure without crushing in which isocyanate indexes between about 60 and 95 are employed. The foam is prepared using the one-shot, free rise (slabstock) technique.

As used throughout the specification and claims, the following terms and phrases are intended to have the noted meanings:

"low density" foam is intended to embrace foams having a density at least below about 2.5 pcf, preferably below about 1.8 pcf, more preferably below about 1.5 pcf, and most preferably below about 1.3 pcf;

"soft" foam is meant to include polyurethane foams having a 25% indention force deflection (IFD) value (see subsequent Examples) of less than about 35, preferably below about 25, and more preferably below about 20 pounds per 50 square inches;

"low resilience" foam, also commonly referred to as "conventional" foam, is intended to include foams having a ball rebound value (ASTM D-3574) of less than about 55%, and more usually less than about 50%;

"open cell structure" refers to foam having sufficient interconnecting cells to allow air-flow therethrough and particularly includes those foams having a porosity of greater than about 20 cubic feet per minute when measured in accordance with the procedure described in connection with the subsequent examples; this porosity substantially corresponds to a porosity value of at least one (1) standard cubic foot per minute when tested by the NOPCO procedure described by R. E. Jones and G. Fesman, *Journal of Cellular Plastics*, Jan. 1965; and "without crushing" refers to a foam that has not undergone any significant deformation; i.e. a foam as originally produced-prior to any steps which would tend to alter its cell structure.

The process of the present invention broadly involves preparing a flexible polyurethane slabstock foam. Which exhibits a substantially open cell structure without crushing, by mixing together, using the one-shot technique, several foam-forming ingredients to form a reaction mixture which is substantially free of chlorofluorocarbon blowing agents and reacting the foam-forming ingredients under conditions which permit the foam to rise freely, said ingredients including: (I) a polyol or polyol blend; (II) an organic polyisocyanate; (III) a processing aid comprising (i) one or more crosslinking and/or extending agents and preferably (ii) a cell opening agent in an amount needed to yield polyurethane foam with a porosity greater than about 20 cubic feet per minute per square foot; (IV) a highly stabilizing surface active agent; (V) polyurethane catalyst; (VI) water, and optionally one or more of the following auxiliary ingredients: (VII) a solid polymer dispersed in any of components (I), (II), or (VI); (VIII) and alkenoic acid-grafted polyalkylene oxide compound; (IX) a non-chlorofluorocarbon, physical (inert) blowing agent; and other optional ingredients known to those skilled in the polyurethane art, as may be useful, for example, in cushioning and packaging applications.

The present invention is based on applicant's surprising finding that by including a small amount of a foam processing aid, particularly including a crosslinking/extending agent, as defined more fully hereinafter, in low isocyanate index formulations for making conventional polyurethane slabstock foam using the free-rise process, foam splitting can be avoided without destroying the open cell structure and high porosity characteristic of conventional foams when parparing low density foams, and particularly soft foams. Thus, the present invention makes it possible to prepare conventional, flexible polyurethane foam, at low densities, using only water to blow and cool the foam. In fact, by using the present invention soft, low density foams can be prepared via the one shot, free-rise procedure without using any inert blowing agents, such as CFCs or methylene chloride, which normally are required to soften and/or cool the foam.

POLYOL

Polyol compositions (I) which can be utilized in the present invention can include a variety of compounds and encompass, but are not limited to, the following polyether polyols:

(a) alkylene oxide adducts of polyhydroxyalkanes;
(b) alkylene oxide adducts of nonreducing sugars and sugar derivatives;
(c) alkylene oxide adducts of polyphenols; and
(d) alkylene oxide adducts of polyamines and polyhydroxyamines.

Alkylene oxides having two to four carbon atoms generally are employed, with propylene oxide, ethylene oxide and mixtures thereof being particularly preferred.

Illustrative alkylene oxide adducts of polyhydroxyalkanes include, among others, the alkylene oxide adducts of glycerine, 1, 2, 4-trihydroxybutane, 1, 2, 6-trihydroxyhexane, 1, 1, 1-trimethylolethane, 1, 1, 1-trimethylopropane, pentaerythritol, xylitol, arabitol, sorbitol, mannitol, and the like.

A further class of polyols which can be employed are the above-mentioned alkylene oxide adducts of the nonreducing sugars and sugar derivatives. Among the nonreducing sugars and sugar derivatives contemplated are sucrose, alkyl glycosides such as methyl glucoside, ethyl glucoside, and the like; glycol glycosides such as ethylene glycol glycoside, propylene glycol glycoside, glycerol glucoside, 1, 2, 6-hexanetriol glycoside, and the like, as well as the alkylene oxide adducts of the alkyl glycosides as set forth in U.S. Pat. No. 3,073,788.

Another class of suitable polyols, as indicated in (c) above, is the alkylene oxide adducts of polyphenols. Among the polyphenols which are contemplated are, for example, condensation products of phenol and formaldehyde, and novolac resins; condensation products of various phenolic compounds and acrolein, the simplest member of this class being 1, 2, 3-tris(hydroxyphenyl) propane; condensation products of various phenolic compounds and glyoxal, gluteraldehyde, and other dialdehydes, the simplest members of this class being the 1, 1, 2, 2-tetrakis(hydroxylphenol)ethanes, and the like.

Suitable polyamines and polyhydroxyamines for reaction with alkylene oxides to prepare the polyols of (d) include inter alia ethylenediamine, propylenediamine, trimethylenediamine, triethylenediamine, monoethanolamine, diethanolamine, triethanolamine, diisopropanolamine, diethanolmonoisopropanolamine, and the like.

The alkylene oxide adducts of phosphorus and polyphosphorus acids are another useful class of polyols. Ethylene oxide, propylene oxide, the epoxybutanes, 3-chloro-1, 2-epoxypropane, and the like are preferred alkylene oxides. Phosphoric acid, phosphorus acid, the polymetaphosphoric acids such as tripolyhphosphoric acid, the polymetaphosphoric acids, and the like are desirable for use in this connection.

Indeed, any material having active hydrogens as determined by the Zerewitinoff test may be utilized to some extent and therefore is included within the broad definition of polyol component. For example, amine-terminated polyether polyols, hydroxyl-terminated polybutadiene polyols and many others are known and may be used as a minor component in combination with the above-identified conventional polyether polyols.

Generally, for use as the polyol component of the present invention the polyol compound (I), i.e. the active hydrogen-containing, polyether polyol component, or blend of polyols should have an equivalent weight in the range of about 500 to about 1500 and an ethylene oxide content of less than 20%, preferably the equivalent weight is in the range of about 500 to about 1300, and most preferably between about 750 and 1250, and the polyol or polyol blend should have a functionality of at least about 2. Equivalent weight is determined from the measured hydroxyl number. Hydroxyl number is defined as the number of milligrams of potassium hydroxide required for the complete hydrolysis of the fully acetylated derivative prepared from one gram of polyol. The relationship between hydroxyl number and equivalent weight is defined by the equation;

$$OH = \frac{56,100}{Eq. Wt.}$$

where OH equals the hydroxyl number of the polyol. Thus, polyols having hydroxyl numbers preferably in the range of about 43 to about 110, and more preferably between about 45 and 75, are used.

Component (I) includes poly (alkylene oxide) polyols with an average (nominal) functionality of greater than two, an equivalent weight between about 500 and about 1500, less than about 50% primary hydroxyl functionality, and an ethylene oxide content of less than about 20% by weight. Preferably, poly (alkylene oxide) polyols with an average functionality of between about 2 to 6, an equivalent weight between about 500 and 1300, less than about 50% primary hydroxyl functionality and less than about 15% by weight, and particularly below about 12% by weight, ethylene oxide content are employed. Using polyether polyols having higher ethylene oxide contents and high levels of primary hydroxyls leads to a tight foam structure and reduced processing latitude.

As recognized by those skilled in the art, such polyether polyols will contain a distribution of molecules of differing intrinsic molecular weight and intrinsic hydroxyl contents, and where relevant, a distribution of intrinsic primary hydroxyl functionality and intrinsic ethylene oxide contents. The measured hydroxyl number, the calculated equivalent weight and other polyol characteristics, thus represent an average value for each parameter in a polyol or polyol blend. The ranges recited above are intended to refer to the average value for these parameters in the polyol or polyol blend.

The most preferred polyols employed in this invention include the poly(oxypropylene) triols and the poly-(oxyethylene-oxyproplylene) triols. Ethylene oxide, when used, can be incorporated in any fashion along the polymer chain. Stated another way, the ethylene oxide can be incorporated either in internal blocks, as terminal blocks, or may be randomly distributed along the polyol chain. However, the manner of incorporation and the ethylene oxide content of the polyol preferably is as noted above. Thus, ethylene oxide is used at a level below about 20% by weight, preferably below about 15% by weight, and more preferably below about 12% by weight and is located primarily within the interior of the polyol chain.

In one particularly useful embodiment, described more fully hereafter, at least a portion of the polyol component is added to the formulation in the form of a polymer polyol, in which reactive monomers have been polymerized within a polyol to form a stable dispersion of the polymer solids within the polyol. Thus, the polyol component in this preferred embodiment may comprise a polyol blend with one constituent being a conventional polyether polyol, e.g. a polyether triol, and the other constituent being a polymer polyol. The polymer polyol also may comprise the only source of polyol in a particular formulation. Use of polymer polyols is particularly useful for low density form grades, and especially for foams having densities of less than about 1.3 pcf, in order to increase the firmness of such foams.

POLYISOCYANATES

Component (II) is an organic isocyanate with functionality of approximately 2.0. The isocyanate is used at a level capable of reacting with only about 60 to 95% of the stoichiometric amount of isocyanate reactive groups (i.e., active hydrogen) within the mixture, i.e. at an isocyanate index of about 60 to 95. Preferably, an isocyanate index of about 60 to 90 is employed, and more preferably an index of between about 65 and 85. A particular advantage of this invention is the wide latitude it affords for varying the isocyanate index while yielding stable, non-splitting, foams with low shrinkage using conventional polyols. The isocyanate index for the commercial production of foam with similar polyol compositions ranges from about 105 to 120. For use in the present invention, the organic isocyanate preferably should not have a functionality of above about 2.4 and more preferably has a nominal functionality of between about 1.8 to 2.2. Using higher functionality polyisocyanates in the present invention leads to foams having relatively poor physical properties, particularly as regards compression set characteristics. In many applications, foams should exhibit a compression set of less than about 20% (90% compression for 22 hours at 150° F).

Organic polyisocyanates that are useful in producing polyurethane foam in accordance with this invention are organic compounds that contain, on average, about two isocyanate groups. Such compounds are well known in the art. Suitable organic polyisocyanates include the hydrocarbon diisocyanates, e.g., the alkylene diisocyantes and the aryl diisocyanates. Examples of suitable polyisocyanates are 2.4-diisocyanatotoluene (2, 4-tolylene diisocyanate), 2, 6-diisocyanatotoluene (2, 6-tolylene diisocyanate), methylene bis (4-cyclohexyIisocyanate), 1, 8-diisocyanatooctane, 1, 5-diisocyanato-2, 2, 4-trimethylpentane, 1, 9-diisocyanatononane, 1, 10-diisocyanatopropylether of 1, 4-butylene glycol. 1, 11-diisocyanatoundecane, 1, 12-diisocyanatododecane bis (isocyanatohexyl) sulfide, 1, 4-diisocyanatobenzene, 3, 5-diisocyanato-o-xylene, 4, 6-diisocyanato-m-xylene, 2, 6diisocyanato-p-xylene, naphthalene-1, 4-diisocyanate 2, 4-diisocyanato-1-chlorobenzene, and 2, 5-diisocyanate-bis (3-methyl-4-isocyanotophenyl) methane 1-nitrobenzene. 4, 4'-diphenylmethylene diisocyanate, 2, 4'-diphenylmethylene diisocyanate, and 4, 4'-diphenylpropane diisocyanate can be used in both their purified or neat forms and their polymeric forms as a minor component in admixture with the above noted difunctional isocyanates, particularly with 2, 4 and 2, 6 tolylene diisocyanate. Preferred polyisocyanates are 2, 4 and 2, 6 tolylene diisocyanates and their mixtures having a functionality of about 2, which are broadly referred to herein simply as TDI. The most preferred polyisocyanate is 80/20 TDI (i.e., a mixture of 80% 2, 4-toluene diisocyanate and 20% 2, 6-toluene diisocyanate).

FOAM PROCESSING AID

A key feature of the present invention involves the use of a foam processing aid (III) for enhancing the properties of low density, slabstock foam made at a low isocyanate index, said foam processing aid including a crosslinking agent and/or extending agent and preferably a sufficient amount of a cell opening agent, preferably a polyethylene oxide monol and/or polyol, to yield a polyurethane foam having a porosity greater than about 20 cubic feet per minute per square foot (CFM-Ft$^2$).

Component (III), the foam processing aid, thus contains at least one crosslinking/extending agent, and possibly may also contain a cell opening agent, which preferably is a polyethylene oxide monol and/or polyol. The crosslinking/extending agent component of the foam processing aid is used in an amount needed to eliminate splitting at the low isocyanate indexes of the present invention and generally is used at a level between about 0.2 and 10 parts by weight, and preferably between 0.5 and 10 parts by weight, per 100 parts of the polyol component (I). Suitable crosslinking/extending agents are those materials which are reactive with isocyanate groups particularly compounds having hydroxyl and/or primary or secondary amine groups and include: (1) crosslinking compounds of an equivalent weight less than about 200, and/or (2) difunctional extender compounds, other than those having only secondary hydroxyl groups, of equivalent weight less than about 200. Preferably, the crosslinking/extending agent has a nominal functionality in the range of 2 to about 8.

A low molecular weight polyfunctional glycolamine crosslinking/extending agent is preferred to make stable, free-rise foams under the conditions of this invention. Diethanolamine (DEOA) is the compound of choice. It preferably is used at levels of from about 0.5 up to about 3 php. Blends of other crosslinkers and/or extenders with diethanolamine can also provide similar advantages. For example, a blend of 25% diethanolamine (DEOA) and 75% of a low molecular weight ethylene oxide adduct of glycerine is another preferred crosslinker composition.

Though diethanolamine or a blend of diethanolamine and a low molecular weight ethylene oxide adduct of glycerine is preferred, other crosslinking/extending agents such as, glycerine itself, triethanolamine, disopropanolamine, ethylene glycol, butanediol, tetraethylenepentamine, polyethyleneimine, the isomers of phenylene diamine, sorbitol, erythritol, sucrose, trimethylolpropane, pentaerythritol, 2, 4, 6-triaminotoluene, isophorone diamine, diethyl tolylene-diamine, ethanolamine, hydrazine, 4, 4'-methylenebis (o-chloroaniline), simple carbohydrates, low molecular weight alkylene oxide, e.g., ethylene oxide, and propylene oxide, adducts of polyfunctional amines or alcohols (e.g., polyfunctional glycols), alkylene oxide adducts of polyfunctional aminoalcohols and polyfunctional alcoholamines, amine-terminated polyalkylene oxides and many other low molecular weight polyfunctional hydroxy and/or amine compounds can be substituted for diethanolamine if desired. An advantage of a blend of DEOA and an ethylene oxide adduct of glycerine lies in its ability to crosslink without appreciably tightening the foam in the absence of additional cell opening agents.

The term crosslinking agent generally is reserved for materials having nominal functionalities above 2, and usually about 3 and higher; while the term extending agent normally refers to materials having a functionality of about two. IT is important in accordance with the present invention that in any formulation, at least one of the polyol component (I) or the crosslinking/extending agent have a functionality of above 2. When the polyol has a functionality of above two, crosslinking will occur even in the presence of difunctional extending agents. Preferably, at least one of components (I) and (III) has a nominal functionality of at least about 3, and particularly useful formulations are those in which both components have a nominal functionality of about 3. Thus, the use of crosslinking agents is preferred in the present invention.

The use of crosslinking/extending agents in conventional foam systems of the prior art at standard isocyanate indexes (105 to 120) has long been avoided due to the excessive foam tightness and foam shrinkage that accompanies their use. Thus, it was entirely unexpected that by using such crosslinking/extending agents the problem of foam splitting at low isocyanate indexes could be solved without introducing unacceptable tightness to the foam. Indeed, if the crosslinker/extender is omitted in the present invention, excessive foam splitting occurs normally leading to non-usable foam.

A second possible constituent of the foam processing aid (III) comprises a cell opening agent. Polyethylene oxide monols and/or polyols are preferred cell opening agents. Suitable polyethylene oxide monol or polyols are those ethylene oxide adducts which contain greater than about 50% ethylene oxide, preferably greater than about 60% and most preferably greater than about 75% by weight ethylene oxide, and have an equivalent weight of greater than about 200, for example an equivalent weight preferably from about 200 to 5,000. The polyethylene oxide preferably has a hydroxyl functionality of two or greater. Lower equivalent weight polyethylene oxide polyols (i.e. equivalent weights of 200 to 1000), are preferred since they are liquid and more easy to handle at ambient conditions. Free-rise, slabstock foam produced with the lower equivalent weight polyethylene oxide compounds also are less prone towards splitting during manufacture than foams made with higher equivalent weight polyethylene oxide polyols. Polyethylene oxide monols or polyols included in formulations according to the present invention as a foam processing aid, i.e. those having greater than 50% ethylene oxide content, should not be included in measurements and calculations for determining the equivalent weight, primary hydroxyl content and ethylene oxide content of the polyol component (I).

Other cell opening agents include such materials as a mixture of acetone and cyclopentane, alkyl and alkenyl esters, many organic and inorganic powders and/or fillers; polyalkylene oxides, preferably the polyethylene oxides noted above, and alkenoic acid-grafted polyalkylene oxides.

The cell opening agent, e.g. the polyethylene oxide monol and/or polyol, preferably is used in an amount needed to yield a polyurethane slabstock foam having a porosity of greater than about 20 cubic feet per minute per square foot (CFM-Ft$^2$). Depending on the other foam ingredients and particularly on the crosslinking- /extending agent(s) employed, cell opening agents such as the polyethylene oxide monols and/or polyols typically may be used in an amount of from 0 up to about 20 parts by weight per hundred parts polyol, preferably in an amount of from about 0.1 to 20 php. In other words, in some formulations there may be no need to include a separate cell opening agent as a component of the foam processing aid since an open cell structure having a sufficient foam porosity will be obtained without crushing using only the crosslinking/extending agent. This is particularly true where the crosslinking agent comprises an ethylene oxide adduct, e.g., ethylene oxide adducts of polyfunctional amines or alcohols. Of course, by using an additional cell opening agent in such formulations foam openness may be enhanced. The cell opening agent, such as polyethylene oxide monol and/or polyol, generallly is used at a level of no more than about 20% by weight of component (I) and preferably no more than about 10% by weight. Using such in the process of the present invention promotes cell opening and improves foam recovery characteristics (e.g. compression set).

STABILIZERS

Component (IV) includes the highly stabilizing silicone surfactants (polyurethane foam stabilizers) widely used in the polyurethane foam industry, especially those used for conventional (flexible), semi-rigid, rigid, and polyester-based polyurethane foam production. Included within the class of such surfactants are the organo-polysiloxane copolymers, the most common ones being the polysiloxane - polyoxyalkylene copolymers, wherein the polysiloxane contains greater than about 10 silicon atoms. The less stabilizing HR foam surfactants, such as the polydimethylsiloxane oils, should be avoided. Highly stabilizing surfactants are available from Union Carbide Corporation as Silicone Surfactants L-520, L-6202 and L-5810. Such stabilizers are employed in small amounts, e.g., from about 0.001 percent up to about 5 percent by weight, based on the total reaction mixture.

Suitable stabilizers for slabstock applications include "hydrolyzable" polysiloxane-polyoxyalkylene block copolymers such as the block copolymer described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British Patent Specification 1,220,471. The latter class of copolymers differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Other suitable silicone surfactants will be recognized by those skilled in the art and their level of use can be determined using routine experimentation.

CATALYSTS

Component (V) includes the standard combination of tertiary amine and organometallic polyurethane catalysts. Any of a large number or polyurethane catalysts may be utilized for producing the polyurethane foam. Typical levels are from about 0.001 to 5 percent based on the weight of the reaction mixture. Levels of about 0.001 to about 2 php are common. Relative proportions are well-known to those skilled in the art. Representative tertiary amine catalysts include: bis(2,2'-dimethylaminoethyl)ether, trimethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethylenediamine, pyridine oxide and the like. For best results, use of a particularly good "blow" catalyst, i.e. a catalyst especially effective for catalyzing the water-isocyanate reaction, is important. Consequently, bis(2,2'-dimethylaminoethyl) ether is highly preferred as the amine catalyst.

Suitable organometallic catalysts include the salt of organic acids with a variety of metals such as alkali metals, alkaline earth metals , Al sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt napthenate, and the like; and organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibuytltin dilaurylmercaptide, dibutyltin-bis(6-methylaminocaproate), and the like. Similarly, there may be used a trialkytin hydroxide, dialkytin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

Other known polyurethane catalysts also can be use in combination with the amine and organometallic catalysts described above. For example, strong bases such as alkali and alkaline earth metal hydroxides, alkoxides, and phenoxides; acidic metal salts of strong acids such as ferric chloride, stannous chloride, antimony trichloride, bismuth nitrate and chloride, and the like; chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceonealkylenediimines, salicyladehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; alcoholates and phenolates of various metals such as $Ti(OR)_4$, $Sn(OR)_4$, $Sn(OR)_2$, $Al(OR)_3$, and the like, wherein R is an alkyl or aryl, and the reaction products of alcoholates with carboxylic acids, beta-diketones, and 2(N,N-dialkylamino)alkanols, such as the well known chelates of titanium obtained by this or equivalent procedures; all can be employed in the process of the present invention.

BLOWING AGENTS

Water (Component (VI)) is preferably used as the sole blowing agent to produce carbon dioxide by reaction with the isocyanate. In the process of the present invention, water is used in an amount from about 2.0 php up to about 12 php, preferably in an amount between about 3.0 (e.g. 3.2 php) and 10 php, more preferably in an amount between about 4.0 and 10 php and most preferably between about 5.0 and 10 php. In the present invention, water in excess of that needed to blow the foam is used. The level of excess water increases dramatically as isocyanate index is lowered below 95 and particularly below 85. The excess water serves to cool the foam during its preparation. By-product steam formed during foam cooling also assists foaming. Additionally, to provide a wider range of properties in the foam products of the present invention, a combination of water and another inert (non-chlorofluorocarbon), physical blowing agent (Component (IX)) may be employed. The quantity of inert blowing agent employed will vary with factors such as the density desired in the foamed product.

Illustrative, inert polyurethane blowing agents include methylene chloride and thermally unstable compounds which liberate gases upon heating such as N,N'-dimethyl-N,N'-dinitrosoterephthalamide, amine, formates, and the like.

The use of auxiliary (physical) blowing agents such as methylene chloride in the process of the present invention enables the production of an even broader range of foam densities and hardnesses, which would be impossible or very difficult to achieve using water alone. It also is possible to use the process of this invention along with other technologies that are less harmful to the environment. These could include use of a process which employs the reaction of formic acid with isocyanate to generate blowing gas.

However, as indicated previously, one of the important advantages of the present invention is that the use of inert blowing agents such as methylene chloride can be avoided or at least minimized in the foam formulation to form low density and/or soft foams, without appreciably sacrificing foam properties relative to prior art conventional foams.

Other Additives

A further improvement on this invention, as indicated earlier, is to include a solid polymer, component (VII) dispersed in the polyol, water or isocyanate. This is best incorporated via a polymer polyol (also called dispersion or graft polyol) in which the reactive monomers are polymerized within the polyol medium to form a stable dispersion of the polymer within the polyol. The solid polymer can be dispersed or formed in situ, e.g. by monomer polyermization, in any one of components (I), (II), or (VI) and may be present at levels of up to 50% by weight of the final foam.

The most common polymer dispersion utilized in polyurethane foam is the polymer polyols in which the solid polymer dispersion is formed by in-situ polymerization of monomers, such as ethylenically unsaturated monomers, added to the polyol and polymerized therein. Also suitable are monomers which undergo reaction with isocyanate containing compounds to form polyurethane polymer dispersions or polyurea polymer dispersions. As noted above, this is the preferred approach for introducing solids into formulations according to the present invention. In such cases, the polyol component of such polymer polyols constitute at least a portion, and may be the only source, of polyol component (I).

Another acceptable approach for incorporating a solid polymer in the formulation of the present invention is to prepare the polymer as an emulsion (latex) within water, for example, by free radical polymerization of ethylenically unsaturated monomers. This approach is best utilized in high water formulations where a considerable amount of the polymer can be incorporated. The water in the emulsion can also supply the water needed to "blow" the foam. Another alternative is to prepare the dispersion within the isocyanate, such as described in U.S. Pat. No. 4,283,500 (Union Carbide Corp.)

The production of stably dispersed polymers within polyols to make polymer polyols is well known in the art. The basic patents in the field are Stamberger Re. 28,715 (reissue of U.S. Pat. No. 3,383,351) and Re. 29,118 (reissue of U.S. Pat. No. 3,304,273). See also U.S. Pat. Nos. 3,652,639, 3,823,201; 3,953,393; 4,119,586, 4,148,840; and 4,282,331. Such compositions can be produced by polymerizing one or more ethylenically unsaturated monomers dissolved or dispersed in a polyol in the presence of a free radical catalyst to form a stable dispersion of polymer particles in the polyol. These polymer polyol compositions have the valuable property of imparting to polyurethane foams produced therefrom higher load-bearing properties than are provided by the correponding unmodified polyols. Also included are the polyols like those taught in U.S. Pat. Nos. 3,325,421 and 4,374,209.

A wide variety of monomers may be utilized for preparing the polymer polyol compositions in accordance with the invention. Numerous ethylenically unsaturated monomers are disclosed in the prior patents. Any of these monomers are suitable. More recently, as noted above, polyurea and polyurethane suspension polymers have also been utilized.

The selection of the monomer or monomers used will depend on considerations such as the relative costs of the monomers and the polyurethane product characteristics required for the intended application. To impart the desired load-bearing to the foams, the monomer or monomers used in preparing the polymer polyol should, of course, desirably be selected to provide a polymer which has a glass transition of at least slightly higher than room temperature. The Tg (glass transition temperature) of the suspension or emulsion polymer should be at least about 40 deg. C. to accomplish the desired load building. The monomer content typically will be selected to provide the desired solids contents, generally at least about 2% by weight, required for the anticipated end-use application. Exemplary monomers include styrene and its derivatives such as para-methylstyrene, acrylates, methacrylates such as methyl methacrylate, acrylonitrile, and other nitrile derivatives such as methacrylonitrile, hydroxyacrylates, acrylamide and the like. The preferred monomer mixtures used to make the polymer polyol compositions include mixtures of acrylonitile and styrene.

The primary advantage in using a dispersed solid is to increase the firmness of the foam that is produced at the lower isocyanate indexes. This is particularly useful for foams having densities of less than about 1.3 pcf prepared by this invention. It also is possible to use the combination of a polymer polyol and an emulsion polymer in water.

A variety of additional additives known to those skilled in the art also may be incorporated in the foam formulations. These may include flame retardants, colorants, mineral fillers, and other materials.

Yet another aspect of the present invention involves the use of foam control agents (Component (IX)), such as those disclosed in U.S. Pat. No. 4,701,474 (Union Carbide Corporation) which is hereby incorporated by reference. These agents include alkenoic acid-grafted polyalkylene oxide compounds, including grafted polyols, and are used in an amount between about 0.01 to about 2 parts per hundred parts of polyol. These slow the foam rise and are especially beneficial when catalytic crosslinkers such as DEOA are used. Such catalytically active crosslinking agents tend to speed the foam rise rate. The foam control agents also may help to maintain reaction balance (reactivity control) and as noted above promote cell opening.

The present invention thus, in its most useful aspects, uses a typical, low resilience/conventional polyol (equivalent weight of 750 to 1250, less than about 50% primary-OH groups and below about 15% weight ethylene oxide content), plus the combination of up to about 10 parts of an added crosslinking agent (eq. wt. less than about 200 and avg. isocyanate reactive functionality of 3 or greater) and up to about 10 parts of a polyalkylene oxide polyol, having an eg. wt. between about 200 and 1000 and greater than 75% ethylene oxide content, as a foam processing aid and between about 5.0 and 10 php water in combination with TDI employed at a level capable of reacting with between about 60 and about 90% and more preferably between about 65 to 85%, of the isocyanate reactive groups and with other standard ingredients to produce flexible, low density (i.e. less than about 1.5 pcf) and generally low resilience and soft (i.e. IFD below about 35), polyurethane slabstock foam, which exhibits a substantially open cell structure without crushing, via a one-shot, free-rise process without foam splitting. This procedure yields flexible foam with acceptable properties for many cushioning and packaging applications.

In practice, the formulations employed in preparing the foams of this invention are prepared by mixing the aforementioned components in standard foam processing equipment in accordance with techniques known to those skilled in the art. In preparing the flexible foam, the ingredients are intimately mixed with each other by the so-called "one-shot" method to provide a foam by a one-step process. In the "one-shot" process, the polyol and polyisocyanate reactants, the catalysts, blowing agents, surfactants and other optional ingredients are mixed together and then dispersed for reaction.

Usually, the foam is prepared as slabstock having a volume of greater than about 50 cubic feet. In one widely used embodiment, the foaming mixture is discharged from a mixing head onto a continuously moving, generally open-topped and open-ended conveyor. As the conveyor advances, foam reactions cause the foam to expand freely upwardly, hence the term free-rise foam. In another known process, i.e. the "Vertifoam" process, the foam slab is produced in an upwardly moving direction by dispensing the foaming mixture into, and allowing it to expand freely outwardly within flexible liners that are moved in a vertical direction. These methods are well-known to those skilled in the art. Due to the particular components employed in accordance with the teachings of this invention, a wider latitude is afforded to the operator in controlling the density, load and other physical properties of the resulting foam, or other inert (non-reactive) blowing agent.

For example, in accordance with the invention, foams can be prepared utilizing a wider range of water, and isocyanate indexes than possible using prior art, conventional foam technology. The advantages of this flexibility in foam processing is that lower density foams and lower load foam grades can be produced without resorting to the use of chlorofluorocarbons.

The following examples are presented to illustrate and not limit the invention. Unless otherwise indicated, the ingredients identified in the following tables are reported as parts by weights, and all temperatures are on the Centigrade scale.

EXAMPLES

As used in these examples, the following designations, terms, and abbreviations shall have the following meanings:

POLYOLS

Polyol A is a polyalkylene oxide triol (nominal) produced by reacting propylene oxide (90%) and ethylene oxide (10%) onto glycerine. It has an equivalent weight of about 970 and contains predominantly secondary terminal hydroxyl groups.

Polyol B is a polyalkylene oxide triol (nominal) produced by reacting propylene oxide onto glycerine. It has an equivalent weight of about 970.

Polyol C is a polyalkylene oxide triol (nominal) produced by reacting propylene oxide onto glycerine. It has an equivalent weight of about 500.

Polyol D is a polyalkylene oxide triol (nominal) produced by reacting propylene oxide (90%) and then ethylene oxide (19%) onto glycerine. It has an equivalent weight of about 1580 and contains predominantly primary terminal hydroxyl groups.

Polyol E is a polymer polyol sold by Union Carbide Corporation as Niax polyol HS-100. It contains about 45 wt. % polymer solids and has a hydroxyl number of about 27.

Polyol F is a polymer polyol sold by Union Carbide Corporation as Niax polyol E-650. It contains about 33 wt. % polymer solids and has a hydroxyl number of about 24.

Polyol G is a dipersion polymer polyol in which the dispersion polymer is formed in the polyol (similar to Polyol A) by the reaction of TDI and a low molecular weight glycol crosslinker.

Polyol H is a nominal difuctional polyol designed to lower hardness of conventional foams and reduce auxiliary blowing agent demands for softening.

Polyol I is a high functionality (nominal 6 functional) polyalkylene oxide polyol having principally secondary hydroxyls formed by reacting propylene oxide onto sorbitol then adding 12% ethylene oxide and capping with propylene oxide.

Polyol J is a polyalkylene oxide triol produced by reacting propylene oxide onto glycerine. It has an equivalent weight of about 335.

II. CROSSLINKERS/EXTENDERS

Crosslinker A is an ethylene oxide adduct of glycerine to yield a trifunctional glycol of 167 equivalent weight.

Crosslinker B is an amine-terminated polyalkylene oxide derived from the propylene oxide adduct of glycerine having an equivalent weight of 86. The final amine-terminated product has an equivalent weight of about 110.

Crosslinker C is a trifunctional ethylene oxide adduct of glycerine having an equivalent weight of about 117.

Crosslinker D is a trifunctional ethylene oxide adduct of glycerine having an equivalent weight of about 77.

Crosslinker E is a trifunctional ethylene oxide adduct of glycerine having an equivalent weight of about 151.

Crosslinker F is very similar to Crosslinker E, having an equivalent weight of 150.

Extender A is a poylglycolamine having a primary amine group and a primary hydroxyl group with an average molecular weight of 163.

Extender B is 1,3 phenylenediamine.

III. CELL OPENING AGENTS

Cell Opener A is a polyalkylene oxide triol (nominal) produced by reacting ethylene oxide onto glycerine. It has an equivalent weight of about 330.

Cell Opener B is a polyalkylene oxide diol (nominal) produced by reacting ethylene oxide onto ethylene glycol. It has an equivalent weight of about 300.

Cell Opener C is a polyalkylene oxide monol (nominal) produced by reacting ethylene oxide onto methanol. It has an equivalent weight of about 350.

Cell Opener D is a polyalkylene oxide triol (nominal) produced by reacting ethylene oxide onto glycerine. It has an equivalent weight of about 3300.

Cell Opener E is a polyalkylene oxide triol (nominal) produced by first reacting ethylene oxide onto glycerine to an equivalent weight of about 330 followed by reaction with a small amount of propylene oxide to yield a predominantly secondary hydroxyl polyol with an equivalent weight of about 460.

IV. SILICONES/SURFACTANTS

Silicone A is a standard commerical hydrolyzable surfactant (polyether-silicone copolymer) used for conventional slabstock foam. (Silicone L-6202 available from Union Carbide Corporation)

Silicone B is a commercial non-hydrolyzable surfactant (polyethersilicone copolymer) used for conventional slabstock foam.

V. LATEXES

Latex A is a styrene/hydroxyethylmethacrylate (95/5) copolymer emulsion in water (45% solids, avg. particle size=0.4 microns).

Latex B is a styrene/ethylacrylate/methylmethacrylate/hydroxyethylmethacrylate/acrylamide (35/20/35/5/5) copolymer emulsion in water (45% solids, 0.4 microns).

Latex C is a commercial emulsion polymer (Rohm & Haas Ropaque OP-62) used as a point opacifier and contains primarily styrene and methylmethacrylate (38% solids, 0.4 microns).

Latex D is a stryene/hydroxyethylmethacrylate/methacrylic acid (93.5/5/1.5) copolymer emulsion in water (55% solids, 0.4 microns).

VI. OTHER FOAM CHEMICALS

A1 is a standard commercial high efficiency amine "blow" catalyst containing 70 wt. % bis(2,2'-dimethylaminoethyl) ether in dipropylene glycol sold by Union Carbide Corporation (Niax® amine catalyst A1).

T-9 is a standard commercial organotin catalyst consisting essentially of stannous octoate.

Catalyst A is a blend of A1 (25%) and triethylenediamine (25%) diluted in dipropylene glycol (50%).

T-10 is a standard commercial organotin catalyst comprising about a 50% dilution of T-9.

33LV is an amine catalyst containing 33 wt. % triethylenediamine in dipropylene glycol.

CFC-11 is essentially trichlorofluoromethane blowing agent (fluorocarbon 11).

80/20 TDI is a standard commercial toluene diisocyanate consisting essentially of 80% of the 2,4 isomer and 20% of the 2,6 isomer.

65/35 TDI is a standard toluene diisocyanate consisting essentially of 65% of the 2,4 isomer and 35% of the 2,6 isomer.

DEOA is diethanolamine.

F.C.A. is a foam control agent consisting essentially of a 10% graft of acrylic acid on a polyalkylene oxide polymer produced by reacting ethylene oxide and propylene oxide with butanol starter.

VII. FOAM PROCESSING CHARACTERISTICS

Cream Time is the time reported in seconds from mixing of TDI with the other chemicals until a noticeable expansion of the foam mixture occurs.

Rise Time is the time reported in seconds from mixing of TDI with the other chemicals until a visible blow-off of gas occurs near full rise signaling cell opening.

% Settling is the percentage of height loss (from maximum foam height) within five minutes after TDI addition.

Shrinkage is visible evidence for foam shrinkage during cooling.

Split is visible evidence that the foam split. This may appear as a sudden violent opening of the foam at the surface ("poof" split) or as a splitting of the foam interior.

VIII. FOAM PROPERTIES (ASTM D 3574-86 test procedures were followed except for porosity and as otherwise indicated)

Density is the weight of foam per unit volume reported in pounds per cubic foot (pcf).

Resiliency is the ball rebound (ASTM D-3574) expressed as a %.

Porosity is a measure of the air flow rate through a one-half inch thick sample of the foam reported in cubic feet per minute per square foot of foam surface area at a differential pressure across the sample of 0.1 inch of water. A five (5) inch by (5) inch specimen of foam ½ inch in thickness is compressed between two pieces of flanged plastic tubing 2-½ inches in diameter (ID). This assembly then becomes a component in an air flow system. Air at a constant inlet pressure of 14.7 psig and at a controlled velocity enters one end of the tubing, flows through the foam specimen and exits through a restriction at the lower end of the assembly. The pressure drop across the foam due to the restriction of air passage through the foam is measured by the means of an inclined closed manometer. One end of the manometer is connected to the upstream side of the foam and the other end to the downstream side. The flow of air on the upstream side of the foam specimen is adjusted to maintain a differential pressure across the specimen of 0.1 inch of water. The porosity of the foam is the flow rate of air under this condition reported in units of air flow per unit area of specimen, cubic feet per minute per square foot.

IFD 25% is the load (indentation force deflection) at 25% compression in lbs. per 50 sq. inches. IFD is a measure of a foam's firmness. Test specimen size was typically 12×12×4 inches for bench foams and 15×15×4 inches for machine foams.

IFD 65% is the load (indentation force deflection) at 65% compression in lbs. per 50 sq. inches.

Return Value is the percentage of the 25% IFD recovered after cycling through the 65% IFD measurement and returning to 25% compression.

IFD 65/25 is the 65% IFD divided by the 25% IFD and is often referred to as support, sag or sac factor or load ratio.

Tensile is the tensile strength reported in psi.

Elongation is the % elongation of the foam specimen at break.

Tear is the tearing strength reported in pounds per linear inch.

COMP 90% is the dry heat aged compression set (loss in height) after holding in a 90% compressed state for 22 hours at 158° F.

HA COMP 75 is the humid aged (6 hrs. at 220° F. and 95% relative humidity) compression set measured after the humid aging by holding in a 75% compressed state for 22 hours at 158° F.

EXAMPLES 1-69

In the examples which follow, bench scale foams (Examples 1-53 and 65-69) were prepared by weighing together all of the formulation ingredients except TDI and stannous octoate catalyst into a one-half gallon paper can, then mixing at 2400 rpm for 15 seconds using a drill press equipped with a bladed agitator. A baffle is inserted into the paper can and mixing is resumed for 60 seconds. Then the mixture is allowed to stand for 15 seconds during which time the tin catalyst is added. Mixing is resumed for 15 seconds with the isocyanate being added with seven seconds left in this period. This complete mixture is quickly poured into a 14×14×6" "cake" box and allowed to foam. The profile and settle are recorded for five minutes and then the foam is placed in an oven at 125° C. for five minutes. After removing the foam from the oven, the foam is allowed to cure at ambient conditions, for at least 16 hours. Indications of foam shrinkage are noted after this period and then the foam is cut 12×12×4" for physical property measurements.

Machine foams (Examples 57-64) were prepared using a pilot scale, low pressure conventional slabstock foam machine. A premix was made of all the components except TDI and stannous octoate, these being injected along with the premix through separate streams to the mixhead. Slabstock buns were made having a length of about 10 to 15 feet and with cross sections of about 36 inches wide by 18 to 24 inches high. Test specimens (15"×15"×4") were cut from the center of each bun.

Commercial scale foams (Examples 54 to 56) were prepared on a full scale low pressure slabstock foam machine in which the polyols and processing aids were pre-mixed. This pre-mix was injected along with separate steams of TDI, tin catalyst, amine catalyst, surfactant and water into the mixhead. This mixture then flowed through a trough and then onto a moving conveyor. Slabstock buns were cut in 30 foot segments from a continuously advancing foam loaf and were between about 20 to 36 inches high and 72 inches wide. Test specimens (15"×15"×4") were cut from the center of the buns for testing.

All of the samples were evaluated in accordance with tests normally employed in the industry. The results are set forth in Tables I-XIII below.

EXAMPLES 1-7; TABLE I

Results presented in Table I shows that by using crosslinking/extending agents, one avoids foam splitting during processing of low density (1 pcf) foam made at 71 to 80 index. Example 1 shows that splitting occurs at an index of 80 without crosslinker. Examples 2 and 5 demonstrate that trifunctional crosslinkers with hydroxyl and amine groups work well. Example 4 demonstrates that a trifunctional crosslinker with only amine functionality (equivalent weight=117) can be used. Examples 3 and 6 show that difunctional extenders with amine and hydroxyl functionality avoid splitting and Examples 7 shows that a difunctional extender with only aromatic amine functionality is acceptable.

EXAMPLES 8-12; TABLE II

In Table II, Examples 8 through 11 show that all hydroxyl functionality crosslinking agents such as glycerine, sorbitol and ethylene oxide adducts of glycerine can be used; while Examples 12 shows that a low molecular weight difunctional extending agent with only primary hydroxyl groups (ethylene glycol) also avoids foam splitting.

EXAMPLES 13-17; TABLE III

In Table III, results are presented which demonstrate that soft, low density foams can be prepared at low isocyanate indexes using blends of crosslinking/extending agents.

EXAMPLES 18-23; TABLE IV

These examples demonstrate that soft, low density (about 1 pcf), flexible polyurethane foam can be prepared at low isocyanate indexes using water as the sole blowing agent while avoiding foam splitting.

EXAMPLES 24-28; TABLE V

These examples demonstrate that in the absence of the crosslinking/extending agent foam splitting occurs at isocyanate indexes of 95 and lower (85), when producing soft foams at somewhat higher densities (1.8-1.9 pcf). Splitting is avoided by using crosslinking/extending agents.

EXAMPLES 29-36; TABLE VI

In these examples soft, low density flexible foam was prepared using several different polyols. As with the previous example, those formulations not using the crosslinking/extending agent resulted in foam splitting.

EXAMPLES 37-42; TABLE VII

These examples demonstrate the use of various supplementary polyols, high in poly(oxyethylene) content, in conjunction with crosslinking/extending agents to produce low index foams. By using the supplementary polyol a more open foam is produced without having to increase the ratio of amine to tin catlyst to a level that could lead to reaction imbalance and poor quality foam. As above, without the crosslinking/extending agent foam splitting occurred.

EXAMPLES 43-48; TABLE VIII

These examples use the so-called polymer polyols or graft polyols or dispersion polyols in the production of low density foams at a low index.

EXAMPLES 49-53; TABLE IX

These examples show the use of combustion polymers in water (latexes) to provide the water for blowing the foam and at the same time to provide reinforcing solids for load building.

EXAMPLES 54-56; TABLE X

These examples demonstrate the commercial scale production of slabstock foam in accordance with the process of the present invention. Extremely open cell structure foam was produced without any splitting at isocyanate indexes between 73 and 85 and without encountering excessive foam temperatures.

EXAMPLES 57-59; TABLE XI

These examples illustrate results obtained by preparing the foam on a pilot scale conventional slabstock foam machine and demonstrate the problem of foam splitting that plagues conventional formulations, (no crosslinking/extending agents) blown with water and CFCs as the isocyanate index is lowered to 95 and below.

EXAMPLES 60-64; TABLE XII

These examples illustrate results obtained by preparing the foam on a pilot scale, conventional slabstock foam machine and demonstrate that by using crosslinking/extending agents, soft low density foam can be prepared at low isocyanate indexes, below 95 and using water as the only blowing agent without encountering foam splitting and without developing excessive foam temperatures.

EXAMPLES 65-69; TABLE XIII

These examples illustrate results obtained at low isocyanate index (75) using a low equivalent weight polyol (335) as described by Dwyer et al in Proceedings of the SPI Cellular Plastics 7th Annual Technical Conference (Examples 65, 67, 68) and a polyol of the type called for by the present invention (Example 66 and 69).

While these tests show stable and non-splitting foam can be produced at the conditions and with the material used by Dwyer et al. (Example 65), attempts to increase the water level to produce lower foam densities resulted in severe foam instability. (Examples 67 and 68). Foams prepared using the claimed crosslinking agents with the conventional, higher equivalent weight polyols, as defined by the present invention, processed well at both the high and low water levels. (Examples 66 and 69).

While certain specific embodiments of the invention have been described with particularity herein, it will be recognized that various modifications thereof will occur to those skilled in the art, and it is to be understood that such modifications and variations are to be included within the purview of this application and the spirit and scope of the appended claims.

TABLE I

| EXAMPLE | 1 | 2 | 3 | 4 | 5 | 6 | 7 |
|---|---|---|---|---|---|---|---|
| POLYOL A | 100.0 | 100.0 | 100.0 | 100.0 | 100.0 | 100.0 | 100.0 |
| WATER | 8.0 | 8.0 | 8.0 | 8.0 | 8.0 | 8.0 | 8.0 |
| DIISOPROPANOLAMINE | | 1.5 | | | | | |
| MONOETHANOLAMINE | | | 1.5 | | | | |
| CROSSLINKER B | | | | 3.0 | | | |
| DIETHANOLAMINE | | | | | 1.0 | | |
| EXTENDER A | | | | | | 2.0 | |
| EXTENDER B | | | | | | | 1.5 |
| A1 | 0.15 | 0.15 | 0.15 | 0.15 | 0.15 | 0.15 | 0.18 |
| T-9 | 0.15 | 0.15 | 0.15 | 0.15 | 0.15 | 0.15 | 0.12 |
| SILICONE A | 1.0 | 1.0 | 1.0 | 1.0 | 1.0 | 1.0 | 1.0 |
| 80/20 TDI | 69.04 | 71.39 | 72.46 | 70.82 | 64.81 | 70.74 | 70.97 |
| INDEX | 80.0 | 80.0 | 80.0 | 80.0 | 73.0 | 80.0 | 80.0 |
| CREAM TIME | 3.0 | 12.0 | 11.0 | 11.0 | 12.0 | 13.0 | 12.0 |
| RISE TIME | 90.0 | 82.0 | 81.0 | 96.0 | 87.0 | 84.0 | 77.0 |
| % SETTLING | 5.25 | 0.85 | 0.55 | 0.56 | 0.0 | 0.65 | 0.0 |
| SHRINKAGE | NIL | NIL | VERY SLIGHT | NIL | NIL | NIL | NIL |
| COMMENTS | SPLIT | | | | | | |
| DENSITY | 1.23 | 1.0 | 1.0 | 0.99 | 1.03 | 1.00 | 1.07 |
| RESILIENCY | 47.0 | 38.0 | 22.0 | 38.0 | 36.0 | 40.0 | — |
| POROSITY | 69.72 | 112.84 | 3.58 | 72.95 | 80.5 | 96.67 | — |
| IFD 25% | 16.0 | 16.5 | 19.5 | 17.75 | 17.33 | 17.75 | 29.10 |
| IFD 65% | 35.75 | 35.0 | 44.25 | 36.75 | 36.28 | 37.75 | 58.55 |
| RETURN VAL | 70.31 | 54.55 | 55.13 | 56.34 | 60.03 | 56.34 | 57.7 |
| IFD 65/25 | 2.23 | 2.12 | 2.27 | 2.07 | 2.07 | 2.13 | 2.01 |
| TENSILE | 11.81 | 13.22 | 13.93 | 14.67 | 10.77 | 14.13 | — |
| ELONGATION | 176.33 | 233.01 | 197.79 | 241.27 | 234.1 | 263.2 | — |
| TEAR | 1.75 | 1.85 | 2.15 | 2.24 | 1.89 | 1.87 | — |

TABLE II

| EXAMPLE | 8 | 9 | 10 | 11 | 12 |
|---|---|---|---|---|---|
| POLYOL A | 100.0 | 100.0 | 100.0 | 100.0 | 100.0 |
| WATER | 8.0 | 8.0 | 8.0 | 8.0 | 8.0 |
| GLYCERINE | 1.5 | | | | |
| SORBITOL | | 1.5 | | | |
| CROSSLINKER D | | | 3.0 | | |
| CROSSLINKER A | | | | 5.0 | |
| ETHYLENE GLYCOL | | | | | 1.5 |
| A1 | 0.15 | 0.15 | 0.15 | 0.15 | 0.15 |
| T-9 | 0.15 | 0.15 | 0.15 | 0.15 | 0.15 |
| SILICONE A | 1.0 | 1.0 | 1.0 | 1.0 | 1.0 |
| 80/20 TDI | 72.44 | 72.47 | 70.98 | 75.57 | 72.4 |
| INDEX | 80.0 | 80.0 | 80.0 | 85.0 | 80.0 |
| CREAM TIME | 18.0 | 17.0 | 17.0 | 17.0 | 16.0 |
| RISE TIME | 94.0 | 92.0 | 97.0 | 97.0 | 89.0 |
| % SETTLING | 0.94 | 9.38 | 0.44 | 2.13 | 1.51 |
| SHRINKAGE | NIL | NIL | NIL | NIL | NIL |
| DENSITY | 1.01 | 1.0 | 1.06 | 1.06 | 1.03 |
| RESILIENCY | 37.0 | 30.0 | 42.0 | 37.0 | 38.0 |
| POROSITY | 69.72 | 14.18 | 125.03 | 145.95 | 125.0 |
| IFD 25% | 19.75 | 23.5 | 19.25 | 19.0 | 16.75 |
| IFD 65% | 42.0 | 46.75 | 40.5 | 41.5 | 36.0 |
| RETURN VAL | 54.43 | 58.51 | 55.84 | 55.26 | 55.22 |
| IFD 65/25 | 2.13 | 1.99 | 2.1 | 2.18 | 2.15 |
| TENSILE | 11.13 | 12.4 | 9.93 | 9.84 | 7.83 |
| ELONGATION | 202.33 | 154.69 | 198.53 | 180.98 | 150.99 |

TABLE II-continued

| EXAMPLE | 8 | 9 | 10 | 11 | 12 |
|---|---|---|---|---|---|
| TEAR | 2.0 | 1.5 | 1.88 | 1.91 | 1.18 |

TABLE III

| EXAMPLE | 13 | 14 | 15 | 16 | 17 |
|---|---|---|---|---|---|
| POLYOL A | 100.0 | 100.0 | 100.0 | 95.0 | 98.0 |
| CELL OPENER A | | | | 5.0 | 2.0 |
| WATER | 8.0 | 8.0 | 8.0 | 8.0 | 8.0 |
| DEOA | 1.0 | 1.0 | 0.5 | 0.5 | 1.1 |
| CROSSLINKER A | 5.0 | | | | |
| CROSSLINKER B | | 5.0 | | | |
| GLYCERINE | | | 0.5 | | |
| SORBITOL | | | | 0.5 | 1.1 |
| A1 | 0.18 | 0.18 | 0.12 | 0.12 | 0.15 |
| T-9 | 0.12 | 0.12 | 0.18 | 0.18 | 0.07 |
| F.C.A. | 0.2 | 0.2 | 0.2 | 0.2 | 0.4 |
| SILICONE B | | | | | 2.0 |

TABLE III-continued

| EXAMPLE | 13 | 14 | 15 | 16 | 17 |
|---|---|---|---|---|---|
| SILICONE A | 1.0 | 1.0 | 1.0 | 1.0 | |
| 80/20 TDI | 66.83 | 69.09 | 64.84 | 65.72 | 68.41 |
| INDEX | 73.2 | 73.2 | 71.0 | 71.0 | 71.0 |
| CREAM TIME | 16.0 | 14.0 | 14.0 | 15.0 | 14.0 |
| RISE TIME | 135.0 | | 94.0 | 99.0 | 144.0 |
| % SETTLING | 1.83 | 1.1 | 0.6 | 1.04 | 0.82 |
| SHRINKAGE | NIL | NIL | NIL | NIL | NIL |
| DENSITY | 1.03 | 1.0 | 1.03 | 0.99 | 1.03 |
| RESILIENCY | 42.0 | 42.0 | 35.0 | 38.0 | 38.0 |
| POROSITY | 115.0 | 77.27 | 80.5 | 114.57 | 65.41 |
| IFD 25% | 16.25 | 11.75 | 17.73 | 14.78 | 14.88 |
| IFD 65% | 36.25 | 27.5 | 40.08 | 33.93 | 34.33 |
| RETURN VAL | 61.54 | 63.83 | 56.98 | 60.07 | 60.5 |
| IFD 65/25 | 2.23 | 2.34 | 2.26 | 2.3 | 2.31 |
| TENSILE | 7.91 | 6.53 | 9.68 | 4.93 | 9.52 |
| ELONGATION | 134.64 | 115.65 | 220.94 | 86.09 | 174.14 |
| TEAR | 0.96 | 0.6 | 1.74 | 0.96 | 1.26 |

TABLE IV

| EXAMPLE | 18 | 19 | 20 | 21 | 22 | 23 |
|---|---|---|---|---|---|---|
| POLYOL A | 100.0 | 100.0 | 100.0 | 100.0 | 60.0 | 100.0 |
| POLYOL D | | | | | 40.0 | |
| CELL OPENER A | | | 5.0 | 5.0 | | |
| WATER | 8.0 | 8.0 | 8.0 | 8.0 | 10.0 | 8.0 |
| DEOA | | 1.0 | 1.0 | 1.0 | 0.5 | 1.0 |
| CROSSLINKER F | | | | | | 3.0 |
| A1 | 0.15 | 0.15 | 0.1 | 0.05 | 0.13 | 0.18 |
| T-9 | 0.15 | 0.15 | 0.2 | 0.3 | 0.2 | 0.12 |
| SILICONE A | 1.0 | 1.0 | 1.0 | 1.0 | 1.0 | 1.0 |
| F.C.A. | | 0.2 | 0.2 | 0.2 | | |
| 80/20 TDI | 73.36 | 75.46 | 61.01 | 56.24 | 54.99 | 72.42* |
| INDEX | 85.0 | 85.0 | 67.8 | 62.5 | 52.0 | 80.0 |
| CREAM TIME | 13.0 | 13.0 | 15.0 | 14.0 | 14.0 | 13.0 |
| RISE TIME | 91.0 | 87.0 | 102.0 | 98.0 | 96.0 | 93.0 |
| % SETTLING | 6.73 | 0.61 | 1.41 | 3.44 | 1.11 | 0.0 |
| SHRINKAGE | NIL | NIL | NIL | NIL | NIL | NIL |
| COMMENTS | SPLIT | | | | | |
| DENSITY | 1.2 | 0.98 | 1.01 | 1.18 | 1.01 | 1.03 |
| RESILIENCY | 48.0 | 34.0 | 30.0 | — | 30.0 | 34.0 |
| POROSITY | 65.41 | 40.08 | 125.03 | 42.77 | 23.9 | 45.5 |
| IFD 25% | 15.25 | 21.5 | 16.05 | 12.5 | 31.85 | 20.02 |
| IFD 65% | 36.25 | 47.25 | 35.65 | 27.7 | 99.20 | 42.45 |
| RETURN VAL | 67.21 | 53.49 | 58.57 | 67.4 | 47.12 | 61.42 |
| IFD 65/25 | 2.38 | 2.2 | 2.22 | 2.22 | 3.12 | 2.12 |
| TENSILE | 12.93 | 11.54 | 8.0 | 7.0 | — | 10.35 |
| ELONGATION | 145.62 | 206.87 | 126.0 | 127.0 | — | 158.54 |
| TEAR | 1.57 | 2.0 | 1.0 | 1.3 | — | 1.73 |

*65/35 TDI

TABLE V

| EXAMPLE | 24 | 25 | 26 | 27 | 28 |
|---|---|---|---|---|---|
| POLYOL A | 100.0 | 100.0 | 100.0 | 100.0 | 100.0 |
| WATER | 3.6 | 3.6 | 3.38 | 3.38 | 3.26 |
| DEOA | 0.45 | | 0.42 | | 0.41 |
| CROSSLINKER A | 1.35 | | 1.26 | | 1.23 |
| F.C.A. | 0.09 | | 0.084 | | 0.075 |
| A1 | 0.1 | 0.1 | 0.15 | 0.15 | 0.18 |
| T-9 | 0.2 | 0.2 | 0.15 | 0.15 | 0.12 |
| SILICONE A | 1.0 | 1.0 | 1.0 | 1.0 | 1.0 |
| 80/20 TDI | 39.15 | 37.19 | 41.55 | 39.54 | 44.71 |
| INDEX | 85.0 | 85.0 | 95.0 | 95.0 | 105.0 |
| CREAM TIME | 11.0 | 9.0 | 10.0 | 8.0 | 9.0 |
| RISE TIME | 168.0 | 157.0 | 149.0 | | |
| % SETTLING | | 6.63 | 1.61 | 4.03 | 2.2 |
| SHRINKAGE | V. SLIGHT | NIL | NIL | NIL | NIL |
| COMMENTS | | SPLIT | | SPLIT | |
| DENSITY | 1.83 | 1.89 | 1.83 | NOT | 1.83 |
| RESILIENCY | 44.0 | — | 44.0 | TESTABLE | 45.0 |
| POROSIY | 55.71 | 53.55 | 75.11 | | 89.12 |
| IFD 25% | 20.88 | 16.77 | 22.48 | | 30.15 |
| IFD 65% | 43.38 | 41.63 | 45.65 | | 58.5 |
| RETURN VAL | 75.81 | 77.79 | 77.31 | | 78.77 |
| IFD 65/25 | 2.08 | 2.48 | 2.03 | | 1.94 |
| TENSILE | 11.66 | 8.22 | 12.72 | | 13.69 |
| ELONGATION | 243.0 | 190.88 | 277.49 | | 199.2 |

TABLE V-continued

| EXAMPLE | 24 | 25 | 26 | 27 | 28 |
|---|---|---|---|---|---|
| TEAR | 1.5 | 1.74 | 1.7 | | 1.69 |

TABLE VI

| EXAMPLE | 29 | 30 | 31 | 32 |
|---|---|---|---|---|
| POLYOL A | 100.0 | 100.0 | | |
| POLYOL B | | | 100.0 | 100.0 |
| WATER | 8.0 | 8.0 | 8.0 | 8.0 |
| DEOA | 1.0 | | 1.0 | |
| CROSSLINKER A | 5.0 | | 5.0 | |
| F.C.A. | 0.2 | | 0.2 | |
| A1 | 0.15 | 0.15 | 0.15 | 0.15 |
| T-9 | 0.15 | 0.15 | 0.15 | 0.15 |
| SILICONE A | 1.0 | 1.0 | 1.0 | 1.0 |
| 80/20 TDI | 73.04 | 69.04 | 73.03 | 69.03 |
| INDEX | 80.0 | 80.0 | 80.0 | 80.0 |
| CREAM TIME | 14.0 | 15.0 | 19.0 | 17.0 |
| RISE TIME | 107.0 | 91.0 | 119.0 | 100.0 |
| % SETTLING | 0.99 | 5.23 | 0.71 | 7.49 |
| SHRINKAGE | NIL | NIL | NIL | NIL |
| COMMENTS | | SPLIT | | SPLIT |
| DENSITY | 1.0 | 1.18 | 0.99 | 1.27 |
| RESILIENCY | 38.0 | | 33.0 | |
| POROSITY | 89.12 | 72.95 | 82.66 | 31.99 |
| IFD 25% | 17.0 | 14.25 | 16.75 | 13.5 |
| IFD 65% | 35.0 | 30.0 | 36.5 | 31.25 |
| RETURN VAL | 58.82 | 70.18 | 59.7 | 68.52 |
| TENSILE | 9.92 | 9.78 | 7.05 | 8.61 |
| ELONGATION | 172.96 | 176.58 | 108.48 | 103.53 |
| TEAR | 1.49 | 1.59 | 0.99 | 0.98 |

| EXAMPLE | 33 | 34 | 35 | 36 |
|---|---|---|---|---|
| POLYOL A | | | 75.0 | 80.0 |
| POLYOL C | 100.0 | | | |
| POLYOL D | | 25.0 | | |
| POLYOL H | | | 20.0 | |
| POLYOL I | | | | 100.0 |
| WATER | 8.0 | 8.0 | 7.5 | 7.5 |
| DEOA | 1.0 | 1.0 | 1.0 | 1.0 |
| CROSSLINKER A | 5.0 | 3.0 | | |
| CROSSLINKER F | | | 3.0 | 3.0 |
| A1 | 0.15 | 0.25 | 0.15 | 0.2 |
| T-9 | 0.15 | 0.07 | 0.15 | 0.1 |
| F.C.A. | 0.2 | | | |
| SILICONE A | 1.0 | 1.0 | 1.0 | 1.0 |
| 80/20 TDI | 79.8 | 65.3 | 70.21 | 68.78 |
| INDEX | 80.0 | 73.0 | 82.0 | 82.0 |
| CREAM TIME | 15.0 | 11.0 | 15.0 | 13.0 |
| RISE TIME | 89.0 | 98.0 | 96.0 | 89.0 |
| % SETTLING | | 0.84 | 0.43 | 1.59 |
| SHRINKAGE | SLIGHT | NIL | NIL | NIL |
| DENSITY | 0.98 | 1.04 | 1.0 | 0.99 |
| RESILIENCY | 21.0 | 42.0 | 35.0 | 39.0 |
| POROSITY | 7.78 | 82.66 | 78.34 | 26.6 |
| IFD 25% | 18.25 | 18.55 | 17.0 | 23.5 |
| IFD 65% | 38.0 | 37.88 | 36.5 | 47.25 |
| RETURN VAL | 56.16 | 61.19 | 58.82 | 61.7 |
| IFD 65/25 | 2.08 | 2.04 | 2.15 | 2.01 |
| TENSILE | 14.63 | 9.46 | 9.14 | 8.63 |
| ELONGATION | 188.67 | 208.22 | 111.48 | 62.96 |
| TEAR | 1.92 | 1.50 | 1.64 | 0.84 |

TABLE VII

| EXAMPLE | 37 | 38 | 39 | 40 | 41 | 42 |
|---|---|---|---|---|---|---|
| POLYOL A | 100.0 | 100.0 | 100.0 | 100.0 | 100.0 | 90.0 |
| CELL OPENER A | | | | | | 10.0 |
| CELL OPENER B | | 5.0 | | | | |
| CELL OPENER C | | | 5.0 | | | |
| CELL OPENER D | | | | 5.0 | | |
| CELL OPENER E | | | | | 5.0 | |
| WATER | 8.0 | 8.0 | 8.0 | 8.0 | 8.0 | 8.0 |
| DEOA | | 1.0 | 1.0 | 1.0 | 1.0 | 0.5 |
| GLYCERINE | | | | | | 0.5 |
| A1 | 0.15 | 0.15 | 0.15 | 0.15 | 0.15 | 0.12 |
| T-9 | 0.15 | 0.15 | 0.15 | 0.15 | 0.15 | 0.18 |
| F.C.A. | | 0.2 | 0.2 | 0.2 | 0.2 | 0.2 |
| SILICONE A | 1.0 | 1.0 | 1.0 | 1.0 | 1.0 | 1.0 |
| 80/20 TDI | 73.36 | 76.7 | 76.13 | 75.57 | 76.42 | 66.57 |
| INDEX | 85.0 | 85.0 | 85.0 | 85.0 | 85.0 | 71.0 |
| CREAM TIME | 13.0 | 13.0 | 14.0 | 14.0 | 14.0 | 16.0 |
| RISE TIME | 91.0 | 87.0 | 91.0 | 86.0 | 92.0 | 106.0 |
| % SETTLING | 6.73 | 4.23 | 1.92 | 4.12 | 1.75 | 4.14 |
| SHRINKAGE | NIL | NIL | NIL | NIL | NIL | NIL |
| COMMENTS | SPLIT | | | | | |
| DENSITY | 1.2 | 1.04 | 1.0 | 1.06 | 1.02 | 1.02 |
| RESILIENCY | 48.0 | 37.0 | 33.0 | 39.0 | 38.0 | 35.0 |
| POROSITY | 65.41 | 85.89 | 114.57 | 93.65 | 100.98 | 114.57 |
| IFD 25% | 15.25 | 21.25 | 17.75 | 16.5 | 20.0 | 11.18 |
| IFD 65% | 36.25 | 45.25 | 38.0 | 34.25 | 43.75 | 25.68 |
| RETURN VAL | 67.21 | 56.47 | 53.52 | 62.1 | 55.0 | 64.43 |
| IFD 65/25 | 2.38 | 2.13 | 2.14 | 2.08 | 2.19 | 2.3 |
| TENSILE | 12.93 | 9.79 | 8.31 | 6.78 | 9.82 | 6.13 |
| ELONGATION | 145.62 | 151.24 | 146.98 | 83.13 | 185.84 | 124.18 |
| TEAR | 1.57 | 1.53 | 1.71 | 0.57 | 1.68 | 0.83 |

TABLE VIII

| EXAMPLE | 43 | 44 | 45 | 46 | 47 | 48 |
|---|---|---|---|---|---|---|
| POLYOL A | 100.0 | 56.0 | 100.0 | 70.0 | 30.0 | 80.0 |
| POLYOL F | | 44.0 | | | | |
| POLYOL E | | | | 30.0 | 70.0 | |
| POLYOL G | | | | | | 20.0 |
| CELL OPENER A | | | 5.0 | 5.0 | 5.0 | |
| WATER | 8.0 | 8.0 | 8.0 | 8.0 | 8.0 | 7.5 |
| DEOA | 1.0 | 1.0 | 1.0 | 1.0 | 1.0 | 1.0 |

TABLE VIII-continued

| EXAMPLE | 43 | 44 | 45 | 46 | 47 | 48 |
|---|---|---|---|---|---|---|
| CROSSLINKER E | | | | | | 3.0 |
| CROSSLINKER A | 3.0 | 3.0 | | | | |
| F.C.A. | | | 0.2 | 0.2 | 0.2 | |
| A1 | 0.18 | 0.25 | 0.25 | 0.25 | 0.25 | 0.15 |
| T-9 | 0.12 | 0.07 | 0.15 | 0.15 | 0.15 | 0.15 |
| SILICONE A | 1.0 | 1.0 | 1.0 | 1.0 | 1.0 | 1.0 |
| 80/20 TDI | 65.96 | 64.15 | 65.87 | 64.82 | 63.41 | 70.2 |
| INDEX | 73.0 | 73.0 | 73.2 | 73.2 | 73.2 | 82.0 |
| CREAM TIME | 12.0 | 11.0 | 12.0 | 12.0 | 12.0 | 13.0 |
| RISE TIME | 101.0 | 95.0 | 85.0 | 88.0 | 81.0 | 89.0 |
| % SETTLING | 1.02 | 0.52 | 8.43 | 1.97 | 0.97 | 2.56 |
| SHRINKAGE | NIL | NIL | NIL | NIL | V. SLIGHT | SLIGHT |
| DENSITY | 1.04 | 0.97 | 1.14 | 0.97 | 0.95 | 1.01 |
| RESILIENCY | 38.0 | 35.0 | — | — | — | 28.0 |
| POROSITY | 112.84 | 60.02 | 48.16 | 64.33 | 37.38 | 13.78 |
| IFD 25% | 17.3 | 25.08 | 11.65 | 17.28 | 29.3 | 18.50 |
| IFD 65% | 36.05 | 52.4 | 25.88 | 40.02 | 68.95 | 42.0 |
| RETURN VAL | 62.14 | 56.43 | 72.32 | 60.64 | 52.13 | 58.11 |
| IFD 65/25 | 2.08 | 2.09 | 2.22 | 2.32 | 2.35 | 2.27 |
| TENSILE | 10.73 | 11.22 | 7.0 | 7.0 | 9.0 | 1 0.13 |
| ELONGATION | 242.85 | 133.13 | 118.0 | 84.0 | 67.0 | 100.5 |
| TEAR | 1.56 | 1.36 | 1.2 | 0.9 | 0.8 | 1.83 |

| EXAMPLE | 49 | 50 | 51 | 52 | 53 |
|---|---|---|---|---|---|
| POLYOL A | 100.0 | 100.0 | 100.0 | 100.0 | 100.0 |
| WATER | 8.0 | | | | |
| DEOA | 1.0 | 1.0 | 1.0 | 1.0 | 1.0 |
| CROSSLINKER A | 3.0 | 3.0 | 3.0 | 3.0 | |
| CROSSLINKER E | | | | | 3.0 |
| A1 | 0.15 | 0.15 | 0.15 | 0.15 | 0.18 |
| T-9 | 0.15 | 0.15 | 0.15 | 0.15 | 0.15 |
| SILICONE A | 1.0 | 1.0 | 1.0 | 1.0 | 1.0 |
| LATEX A | | 14.4 | | | |
| LATEX B | | | 14.5 | | |
| LATEX C | | | | 12.8 | |
| LATEX D | | | | | 17.9 |
| 80/20 TDI | 65.96 | 65.96 | 65.96 | 65.96 | 66.07 |
| INDEX | 73.0 | 73.0 | 73.0 | 73.0 | 73.0 |
| CREAM TIME | 13.0 | 13.0 | 13.0 | 13.0 | 13.0 |
| RISE TIME | 95.0 | 99.0 | 110.0 | 104.0 | 116.0 |
| % SETTLING | | 1.59 | 0.68 | 1.01 | 2.61 |
| SHRINKAGE | NIL | NIL | NIL | NIL | NIL |
| DENSITY | 0.98 | 1.07 | 1.07 | 1.03 | 1.11 |
| RESILIENCY | 38.0 | 39.0 | 38.0 | 38.0 | 39.0 |
| POROSITY | 85.89 | 104.11 | 83.19 | 114.57 | 114.57 |
| IFD 25% | 15.25 | 17.48 | 17.4 | 18.0 | 20.7 |
| IFD 65% | 33.45 | 36.15 | 35.85 | 36.33 | 49.03 |
| RETURN VAL | 60.98 | 60.94 | 61.35 | 60.42 | 59.66 |
| IFD 65/25 | 2.19 | 2.07 | 2.06 | 2.02 | 2.37 |
| TENSILE | 9.16 | 7.69 | 10.45 | 11.16 | 8.85 |
| ELONGATION | 188.86 | 129.4 | 214.66 | 226.53 | 150.1 |
| TEAR | 1.58 | 1.4 | 1.71 | 2.03 | 1.82 |

TABLE X

| EXAMPLE | 54 | 55 | 56 |
|---|---|---|---|
| POLYOL A | 50 | 100 | 100 |
| POLYOL E | 50 | | |
| WATER | 6.5 | 4.0 | 7.0 |
| CROSSLINKER A | 2.0 | 2.67 | 2.67 |
| DEOA | 1.0 | 1.33 | 1.33 |
| A-1 | 0.067 | 0.067 | 0.067 |
| T-10 | 0.14 | 0.14 | 0.2 |
| F.C.A. | 0.2 | 0.2 | 0.2 |
| SILICONE A | 0.5 | 0.4 | 0.5 |
| 80/20 T.D.I. | 58.4 | 44.5 | 59.4 |
| INDEX | 80.0 | 85.0 | 73.0 |
| SHRINKAGE | NIL | NIL | NIL |
| FOAM TEMP. °C. | 166 | | 164 |
| DENSITY | 0.99 | 1.58 | 0.97 |
| RESILIENCY | 34.0 | 52.0 | 40.0 |
| POROSITY | 167 | 94 | 188 |
| IFD 25% | 30.0 | 17.3 | 12.8 |
| IFD 65% | 61.0 | 34.3 | 24.8 |
| RETURN VAL | 52.5 | 79.7 | 64.7 |
| IFD 65/25 | 2.03 | 1.99 | 1.94 |
| TENSILE | 16.7 | 16.3 | 8.0 |
| ELONGATION | 216 | 360 | 208 |
| COMP 90% | 29.9 | 9.2 | 14.6 |
| HA COMP 75% | 31.3 | 13.5 | 15.8 |

TABLE XI

| EXAMPLE | 57 | 58 | 59 |
|---|---|---|---|
| POLYOL A | 100. | 100. | 100. |
| WATER | 5.5 | 5.5 | 5.5 |
| CFC 11 | 10. | 10. | 10. |
| A1 | 0.050 | 0.050 | 0.05 |
| T-9 | 0.2 | 0.250 | 0.25 |
| SILICONE A | 1. | 1. | 1. |
| 80/20 TDI | 68.4 | 59.1 | 56. |
| INDEX | 110. | 95. | 90. |
| FOAM TEMP | 171. | 167. | 163. |
| SHRINKAGE | NIL | NIL | NIL |
| COMMENTS | | MILD SPLITTING | SEVERE SPLITTING |
| DENSITY | 1.0 | 1.04 | 1.03 |
| RESILIENCY | 41.0 | 44.0 | 48.0 |
| POROSITY | 9.98 | 42.77 | 42.77 |
| IFD 25% | 32.88 | 22.33 | 16.73 |
| IFD 65% | 69.72 | 46.42 | 36.65 |
| RETURN VAL | 62.89 | 67.08 | 69.51 |
| IFD 65/25 | 2.12 | 2.08 | 2.19 |
| TENSILE | 18.92 | 17.6 | 19.65 |
| ELONGATION | 142.67 | 125.74 | 142.97 |
| TEAR | 1.95 | 2.41 | 2.18 |
| COMP 90% | 8.52 | 6.07 | 7.29 |
| HA COMP 75 | 11.5 | 7.18 | 8.98 |

TABLE XII

| EXAMPLE | 60 | 61 | 62 | 63 | 64 |
|---|---|---|---|---|---|
| POLYOL A | 88.1 | 90.4 | 90.1 | 25.0 | 97.8 |
| CELL OPENER A | 2.3 | | 1.9 | 2.3 | 2.2 |
| LATEX C | 9.6 | 9.6 | 8.0 | | |
| POLYOL E | | | | 72.7 | |
| WATER | | | | 6.5 | 3.75 |
| DEOA | 0.75 | 0.75 | 0.63 | 0.75 | 0.70 |
| A1 | 0.15 | 0.125 | 0.125 | 0.15 | 0.1 |
| T-9 | 0.18 | 0.15 | 0.12 | 0.15 | 0.22 |
| SILICONE A | 1.0 | 1.0 | 1.0 | 1.0 | 1.0 |
| 80/20 TDI | 56.07 | 55.74 | 54.25 | 57.89 | 35.5 |
| INDEX | 82.0 | 82.0 | 92.0 | 82.0 | 75.0 |
| FOAM TEMP | 169.0* | 165.0* | 172.0 | 169.0 | |
| SHRINKAGE | NIL | NIL | NIL | NIL | NIL |
| COMMENTS | | | | | |

TABLE XII-continued

| EXAMPLE | 60 | 61 | 62 | 63 | 64 |
|---|---|---|---|---|---|
| DENSITY | 1.06 | 0.96 | 1.13 | 1.14 | 1.65 |
| RESILIENCY | 42.0 | 40.0 | 40.0 | 39.0 | 42.0 |
| POROSITY | 114.57 | 107.45 | 122.54 | 80.5 | 64.33 |
| IFD 25% | 13.5 | 14.25 | 19.75 | 38.75 | 8.82 |
| IFD 65% | 29.5 | 31.25 | 41.75 | 91.0 | 19.65 |
| RETURN VAL | 68.52 | 61.4 | 62.03 | 55.48 | 79.04 |
| IFD 65/25 | 2.19 | 2.19 | 2.11 | 2.35 | 2.23 |
| TENSILE | 9.52 | 8.79 | 12.99 | 19.85 | 6.59 |
| ELONGATION | 248.02 | 214.3 | 279.14 | 143.07 | 241.5 |
| TEAR | 1.4 | 1.19 | 2.13 | 1.74 | 0.84 |
| COMP 90% | 9.47 | 21.96 | 10.74 | 20.24 | — |
| HA COMP 75 | 10.93 | — | — | 26.80 | 20.12 |

*ESTIMATED FROM RUNS OF SIMILAR COMPOSITION.

TABLE XIII

| EXAMPLE | 65 | 66 | 67 | 68 | 69 |
|---|---|---|---|---|---|
| POLYOL J | 100.0 | | 100.0 | 100.0 | |
| POLYOL A | | 100.0 | | | 100.0 |
| WATER | 4.0 | 4.0 | 7.5 | 7.5 | 7.5 |
| DEOA | | 1.5 | | | 1.5 |
| CROSSLINKER A | | 3.0 | | | 3.0 |
| 33LV | 0.375 | 0.375 | 0.375 | | 0.375 |
| A1 | | | | 0.100 | |
| T-9 | 0.125 | 0.125 | 0.125 | 0.120 | 0.125 |
| SILICONE A | 2.0 | 2.0 | 2.0 | 1.20 | 2.0 |
| F.C.A. | | 0.20 | | | 0.2 |
| 80/20 TD | 48.6 | 39.68 | 73.99 | 73.99 | 65.07 |
| INDEX | 75.0 | 75.0 | 75.0 | 75.0 | 75.0 |
| CREAM TIME | 12.0 | 13.0 | 8.0 | 11.0 | 14.0 |
| RISE TIME | 117.0 | 160.0 | | | 113.0 |
| % SETTLING | 1.17 | | | | |
| SHRINKAGE | HIGH | V. SLIGHT | | | V. SLIGHT |
| COMMENTS | TIGHT FOAM | GOOD FOAM | COLLAPSED | COLLAPSED | GOOD FOAM |

I claim:

1. A process for making low density, flexible conventional polyurethane slabstock foam having a substantially open cell structure without crushing which comprises reacting, in the presence of a highly stabilizing polyurethane foam stabilizer and under a condition which permits the foam to rise freely, a reaction mixture substantially free of chlorofluorocarbon blowing agents comprising:
   (a) polyether polyol or polyol blend having an equivalent weight between about 500 and about 1500 and a nominal functionality of at least two, a primary hydroxyl content of less than about 50% and an ethylene oxide content of less than 20%, and optionally containing a stably dispersed solid formed by in situ polymerization of monomers within the polyol;
   (b) water in an amount from about 2.0 to about 12 parts per hundred parts of polyol a);
   (c) organic polyisocyanate having a nominal functionality of approximately two, present in an amount yielding an isocyanate index between about 60 and about 95.
   (d) polyurethane foam catalyst; and
   (e) a foam processing aid comprising
      (i) at least one crosslinking/extending agent having an average of at least two isocyanate reactive groups per molecule and an equivalent weight of less than about 200 in an amount needed to prevent foam splitting; and optionally
      (ii) a polyurethane oxide monol and/or polyol having an ethylene oxide content of greater than 50% by weight.

2. The process of claim 1 wherein the polyol has an equivalent weight between about 500 and 1300, and an ethylene oxide content of less than 15%.

3. The process of claim 1 wherein crosslinking/extending agent is selected from the group consisting of diethanolamine, triethanolamine, diisopropanolamine, ethylene glycol, glycerine, trimethyolpropane, sorbitol, erythritol, sucrose, butanediol, the isomers of phenylene diamine, pentaerythritol, 2,4,6-triaminotoluene, isophorone diamine, diethyltolylene diamine, ethanolamine, hydrazine, simple carbohydrates and low molecular weight alkylene oxide adducts of (i) polyfunctional amines, (ii) polyfunctional alcohols, (iii) aminoalcohols and (iv) alcoholamines; and mixtures thereof.

4. The process of claim 1 wherein the crosslinking-/extending agent includes diethanolamine.

5. The process of claim 4 wherein the crosslinking-/extending agent also includes an ethylene oxide and adduct of glycerine.

6. The process of claim 1 wherein the crosslinking-/extending agent has at least three isocyanate reactive groups per molecule and is employed in an amount equal to about 0.5 to about 10 parts per hundred parts of polyol.

7. The process of claim 1 wherein the amount of water ranges from about 4.0 to about 10 parts per hundred parts of polyol.

8. The process of claim 1 wherein the catalyst comprises a combination of a tertiary amine catalyst and an organometallic catalyst and is employed in an amount equal to 0.001 to 5 percent based on the weight of the reaction mixture.

9. The process of claim 1 wherein the organic polyisocyanate consists essentially of TDI and is present at an isocyanate index between about 65 and 85.

10. The process of claim 9 wherein the amount of water ranges from about 5.0 to about 10 parts per hundred parts of polyol.

11. The process of claim 1 wherein the polyurethane foam stabilizer is an organo-polysiloxane copolymer having at least 10 silicon atoms.

12. The process of claim 11 wherein the organo-polysiloxane copolymer is a polysiloxane-polyoxyalkylene copolymer and is employed in an amount ranging from about 0.001 to 5.0 percent based on the weight of the reaction mixture.

13. The process of claim 2 wherein said polyol is a polyether-triol and said polyisocyanate is present at an isocyanate index between about 60 and 90.

14. The process of claim 1 wherein the foam has an indention load deflection (ILD) value of less than about 35 pounds per 50 square inches and the foam density is less than 1.8 pounds per cubic foot.

15. The process of claim 1 wherein the polyethylene oxide monol and/or polyol is included in the foam processing aid and has an ethylene oxide content of greater than 60% by weight and an equivalent weight between about 200 and 5,000 and is employed in an amount of up to 20 parts per hundred parts of polyol (a).

16. The process of claim 15 wherein the polyethylene oxide monol and/or polyol has an equivalent weight between about 200 and 1000.

17. The process of claim 1 wherein one of a components (a), (b) or (c) contains a solid polymer dispersed therein.

18. The process of claim 17 wherein said solid polymer is dispersed in water.

19. The process of claim 18 wherein said water comprises a sole blowing agent.

20. The process of claim 1 wherein an alkenoic-acid grafted polyalkylene oxide is employed in an amount between about 0.01 to about 2.0 parts per hundred parts of polyol.

21. A flexible polyurethane foam manufactured by the process of claim 1.

22. The polyurethane foam of claim 21 having a foam density of less than about 1.8 pounds per cubic foot.

23. The polyurethane foam of claim 22 having a foam density of less than about 1.3 pounds per cubic foot.

24. A process for making low density, flexible conventional polyurethane slabstock foam having a substantially open cell structure without crushing which comprises, reacting in the presence of a highly stabilizing polyurethane foam stabilizer and under a condition which permits the foam to rise freely, a reaction mixture substantially free of chlorofluorocarbon blowing agents comprising:
(a) polyether polyol or polyol blend having an equivalent weight between about 500 and about 1500, less than 50 percent primary hydroxyl groups, an ethylene oxide content of less than 20% and a nominal functionality of at least two, and optionally containing a stably dispersed solid formed by in situ polymerization of monomers within the polyol;
(b) water in an amount of from about 2.0 to about 12 parts per hundred parts of polyol;
(c) organic polyisocyanate having a nominal functionality of approximately two present in an amount yielding an isocyanate index between about 60 and about 95;
(d) a tertiary amine catalyst and an organometallic catalyst; and
(e) a foam processing aid comprising
  (i) at least one crosslinking/extending agent having an average of at least two isocyanate reactive groups per molecule and an equivalent weight of less than about 200 in an amount sufficient to prevent foam splitting; and
  (ii) a cell opening agent in an amount needed to yield a polyurethane slabstock foam with a porosity greater than about 20 cubic feet per minute per square foot.

25. The process of claim 24 wherein the polyol has less than 15 percent ethylene oxide content and the polyisocyanate is present at an isocyanate index between about 60 and 90.

26. The process of claim 24 wherein the crosslinking/extending agent is selected from the group consisting of diethanolamine, triethanolamine, diisopropanolamine, ethylene glycol glycerine, trimethyolpropane, sorbitol, erythritol, sucrose, butanediol, the isomers of phenylene diamine, pentaerythritol, 2,4,6-triaminotoluene, isophorone diamine, diethyl tolylene diamine, ethanolamine, hydrazine, simple carbohydrates, low molecular weight ethylene oxide adducts of (i) polyfunctional amines, (ii) polyfunctional alcohols, (iii) aminoalcohols and (iv) alcoholamines; and mixtures thereof.

27. The proces of claim 24 wherein the crosslinking/extending agent includes diethanolamine and an ethylene oxide adduct of glycerine.

28. The process of claim 24 wherein the crosslinking/extending agent has at least three isocyanate reactive groups per molecule and is employed in an amount equal to about 0.5 to about 10 parts per hundred parts of polyol.

29. The process of claim 24 wherein the amount of water ranges from about 4.0 to about 10 parts per hundred parts of polyol.

30. The process of claim 24 wherein the catalyst is a mixture of bis(2,2'-dimethylamino)ethylether and an organotin compound and is employed in an amount equal to 0.001 to 5 percent based on the weight of the reaction mixture.

31. The process of claim 24 wherein the organic polyisocyanate consists essentially of TDI.

32. The proces of claim 24 wherein the polyurethane form stabilizer is an organo-polysiloxane copolymer having at least 10 silicon atoms.

33. The process of claim 32 wherein the organo-polysiloxane copolymer is a polysiloxane-polyoxyalkylene copolymer and is employed in an amount ranging from 0.001 to 5.0 percent based on the weight of the reaction mixture.

34. The process of claim 24 wherein said polyol is a polyether triol and said polyisocyanate is present at an isocyanate index between about 65 and 85.

35. The process of claim 34 wherein the amount of water ranges from about 5.0 to 10 parts per hundred parts of polyol.

36. The process of claim 24 wherein the foam has an indention load deflection (ILD) value of less than about 35 pounds per 50 square inches and the foam density is less than 1.8 pounds per cubic foot.

37. A flexible polyurethane foam manufactured by the process of claim 24.

38. The polyurethane foam of claim 37 having a foam density of less than about 1.8 pounds per cubic foot.

39. The polyurethane foam of claim 38 having a foam density of less than about 1.3 pounds per cubic foot.

40. The process of claim 24 wherein said water is a sole blowing agent.

41. The process of claim 24 wherein the cell opening agent comprises a polyalkylene oxide.

42. The process of claim 41 wherein the polyalkylene oxide cell opening agent comprises a polyethylene oxide monol and/or polyol having an ethylene oxide content of greater than 50% and an equivalent weight between about 200 and 5,000 and is employed in an amount of from about 0.1 parts up to about 20 parts per hundred parts of polyol (a).

43. The process of claim 42 wherein the polyethylene oxide monol and/or polyol has an equivalent weight between about 200 and 1000.

44. The process of claim 24 wherein the cell opening agent comprises an alkenoic-acid grafted polyalkylene oxide.

45. The process of claim 24 wherein the polyol includes a polymer polyol having at least 2% by weight solids.

46. The process of claim 24 wherein one of a components (a), (b) or (c) contains a solid polymer dispersed therein.

47. The process of claim 46 wherein said solid polymer is dispersed in water.

* * * * *

UNITED STATES PATENT AND TRADEMARK OFFICE
CERTIFICATE OF CORRECTION

PATENT NO. : 4,950,694
DATED : August 21, 1990
INVENTOR(S) : Stanley L. Hager

It is certified that error appears in the above-identified patent and that said Letters Patent is hereby corrected as shown below:

Column 7, line 5, "(oxyethylene-oxyproplylene)" should read --(oxyethylene-oxypropylene)--.

Column 8, line 47, "diisocyantes" should read --diisocyanates--.

Column 8, line 48, "2.4-diisocyanatotoluene" should read --2,4-diisocyanatotoluene--.

Column 8, line 57, "2, 6diisocyanato-p-xylene," should read --2,6-diisocyanato-p-xylene--.

Column 10, line 7, "IT" should read --it--.

Column 11, line 17, "generallly" should read --generally--.

Column 12, line 17, "sn" should read --Sn--.

Column 20, line 14, "Examples" should read --Example--.

Column 20, line 61, "catlyst" should read --catalyst--.

Column 21, line 2, "combustion" should read --emulsion--.

Column 27, line 24, insert --Table IX--.
Column 12, line 15, "salt" should read --salts--.

UNITED STATES PATENT AND TRADEMARK OFFICE
CERTIFICATE OF CORRECTION

PATENT NO. : 4,950,694

DATED : August 21, 1990

INVENTOR(S) : Stanley L. Hager

It is certified that error appears in the above-identified patent and that said Letters Patent is hereby corrected as shown below:

Column 29;
Claim 1, line 66, "polyurethane" should read --polyethylene--.

Column 31, line 14;
Claim 17, line 1, delete "a".

Column 33, line 7,
Claim 46, line 1, delete "a".

Signed and Sealed this

Twenty-fifth Day of February, 1992

Attest:

HARRY F. MANBECK, JR.

*Attesting Officer*    *Commissioner of Patents and Trademarks*